United States Patent
Ramaswamy et al.

(10) Patent No.: US 10,652,127 B2
(45) Date of Patent: May 12, 2020

(54) FUSING ONLINE MEDIA MONITORING DATA WITH SECONDARY ONLINE DATA FEEDS TO GENERATE RATINGS DATA FOR ONLINE MEDIA EXPOSURE

(71) Applicant: The Nielsen Company (US), LLC, Schaumburg, IL (US)

(72) Inventors: Arun Ramaswamy, Tampa, FL (US); Jan Besehanic, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 711 days.

(21) Appl. No.: 14/506,282

(22) Filed: Oct. 3, 2014

(65) Prior Publication Data

US 2016/0099856 A1 Apr. 7, 2016

(51) Int. Cl.
*H04L 12/26* (2006.01)
*G06F 16/48* (2019.01)
*G06F 16/955* (2019.01)
*G06Q 30/02* (2012.01)

(52) U.S. Cl.
CPC .......... *H04L 43/106* (2013.01); *G06F 16/489* (2019.01); *G06F 16/955* (2019.01); *G06Q 30/02* (2013.01)

(58) Field of Classification Search
None
See application file for complete search history.

(56) References Cited

U.S. PATENT DOCUMENTS

| | | | |
|---|---|---|---|
| 2,903,508 | A | 9/1959 | Hathaway |
| 4,107,735 | A | 8/1978 | Frohbach |
| 4,425,642 | A | 1/1984 | Moses et al. |
| 4,547,804 | A | 10/1985 | Greenberg |
| 4,599,644 | A | 7/1986 | Fischer |
| 4,647,974 | A | 3/1987 | Butler et al. |
| 4,805,020 | A | 2/1989 | Greenberg |
| 4,956,709 | A | 9/1990 | Richer et al. |
| 4,967,273 | A | 10/1990 | Greenberg |
| 4,969,041 | A | 11/1990 | O'Grady et al. |
| 4,972,471 | A | 11/1990 | Gross et al. |

(Continued)

OTHER PUBLICATIONS

Wakamiya et al. 2011. DASFAA Workshops 2011, LCS 6637, pp. 390-401.I.*

(Continued)

*Primary Examiner* — Tuankhanh D Phan
(74) *Attorney, Agent, or Firm* — Hanley, Flight & Zimmerman, LLC

(57) ABSTRACT

Methods, apparatus, systems, storage media, etc., to fuse online media monitoring data with secondary online data feeds to generate ratings data for online media exposure are disclosed. Example methods disclosed herein to determine ratings data for online media exposure include accessing timestamps included in monitoring data obtained by monitoring exposure to online media. Such example methods also include searching a secondary online data feed using the timestamps included in the monitoring data for data entries associated with exposure to the online media. Such example methods further include fusing the data entries from the secondary online data feed with the monitoring data to generate the ratings data for online media exposure.

20 Claims, 20 Drawing Sheets

(56) References Cited

U.S. PATENT DOCUMENTS

| | | |
|---|---|---|
| 4,994,916 A | 2/1991 | Pshtissky et al. |
| 5,200,822 A | 4/1993 | Bronfin et al. |
| 5,220,426 A | 6/1993 | Karlock |
| 5,243,423 A | 9/1993 | DeJean et al. |
| 5,319,453 A | 6/1994 | Copriviza et al. |
| 5,327,237 A | 7/1994 | Gerdes et al. |
| 5,386,240 A | 1/1995 | Hori |
| 5,387,941 A | 2/1995 | Montgomery et al. |
| 5,400,401 A | 3/1995 | Wasilewski et al. |
| 5,425,100 A | 6/1995 | Thomas et al. |
| 5,450,122 A | 9/1995 | Keene |
| 5,450,134 A | 9/1995 | Legate |
| 5,455,630 A | 10/1995 | McFarland et al. |
| 5,459,867 A | 10/1995 | Adams et al. |
| 5,463,423 A | 10/1995 | Tults |
| 5,481,370 A | 1/1996 | Kim |
| 5,488,409 A | 1/1996 | Yuen et al. |
| 5,495,282 A | 2/1996 | Mostafa et al. |
| 5,512,933 A | 4/1996 | Wheatley et al. |
| 5,523,853 A | 6/1996 | Yamashita et al. |
| 5,526,427 A | 6/1996 | Thomas et al. |
| 5,532,732 A | 7/1996 | Yuen et al. |
| 5,534,928 A | 7/1996 | Iwamura |
| 5,539,471 A | 7/1996 | Myhrvold et al. |
| 5,550,575 A | 8/1996 | West et al. |
| 5,557,333 A | 9/1996 | Jungo et al. |
| 5,559,559 A | 9/1996 | Jungo et al. |
| 5,572,247 A | 11/1996 | Montgomery et al. |
| 5,583,576 A | 12/1996 | Perlman et al. |
| 5,587,743 A | 12/1996 | Montgomery et al. |
| 5,604,542 A | 2/1997 | Dedrick |
| 5,608,445 A | 3/1997 | Mischler |
| 5,629,738 A | 5/1997 | Kim |
| 5,646,675 A | 7/1997 | Copriviza et al. |
| 5,651,065 A | 7/1997 | Stufflet et al. |
| 5,659,366 A | 8/1997 | Kerman |
| 5,659,368 A | 8/1997 | Landis |
| 5,661,526 A | 8/1997 | Hamamoto et al. |
| 5,664,046 A | 9/1997 | Abecassis |
| 5,666,168 A | 9/1997 | Montgomery et al. |
| 5,668,603 A | 9/1997 | Copeland |
| 5,675,388 A | 10/1997 | Cooper |
| 5,708,476 A | 1/1998 | Myhrvold et al. |
| 5,719,634 A | 2/1998 | Keery et al. |
| 5,724,103 A | 3/1998 | Batchelor |
| 5,731,841 A | 3/1998 | Rosenbaum et al. |
| 5,734,413 A | 3/1998 | Lappington et al. |
| 5,737,025 A | 4/1998 | Dougherty et al. |
| 5,737,026 A | 4/1998 | Lu et al. |
| 5,739,864 A | 4/1998 | Copeland |
| 5,739,866 A | 4/1998 | Kim et al. |
| 5,745,184 A | 4/1998 | Neal |
| 5,748,763 A | 5/1998 | Rhoads |
| 5,748,783 A | 5/1998 | Rhoads |
| 5,757,414 A | 5/1998 | Thorne |
| 5,768,426 A | 6/1998 | Rhoads |
| 5,796,441 A | 8/1998 | Oshita |
| 5,801,782 A | 9/1998 | Patterson |
| 5,808,689 A | 9/1998 | Small |
| 5,812,928 A | 9/1998 | Watson, Jr. et al. |
| 5,818,935 A | 10/1998 | Maa |
| 5,828,402 A | 10/1998 | Collings |
| 5,832,119 A | 11/1998 | Rhoads |
| 5,838,382 A | 11/1998 | Cahill, III |
| 5,850,266 A | 12/1998 | Gimby |
| 5,850,481 A | 12/1998 | Rhoads |
| 5,854,660 A | 12/1998 | Tichelaar |
| 5,872,588 A | 2/1999 | Aras et al. |
| 5,880,789 A | 3/1999 | Inaba |
| 5,889,548 A | 3/1999 | Chan |
| 5,930,369 A | 7/1999 | Cox et al. |
| 5,956,716 A | 9/1999 | Kenner et al. |
| 5,973,683 A | 10/1999 | Cragun et al. |
| 6,058,430 A | 5/2000 | Kaplan |
| 6,124,877 A | 9/2000 | Schmidt |
| 6,125,259 A | 9/2000 | Perlman |
| 6,137,539 A | 10/2000 | Lownes et al. |
| 6,173,271 B1 | 1/2001 | Goodman et al. |
| 6,184,918 B1 | 2/2001 | Goldschmidt Iki et al. |
| 6,208,735 B1 | 3/2001 | Cox et al. |
| 6,209,130 B1 | 3/2001 | Rector, Jr. et al. |
| 6,216,265 B1 | 4/2001 | Roop et al. |
| 6,229,801 B1 | 5/2001 | Anderson et al. |
| 6,236,395 B1 | 5/2001 | Sezan et al. |
| 6,260,193 B1 | 7/2001 | Chang et al. |
| 6,269,215 B1 | 7/2001 | Okayama et al. |
| 6,278,791 B1 | 8/2001 | Honsinger et al. |
| 6,295,092 B1 | 9/2001 | Hullinger et al. |
| 6,308,253 B1 | 10/2001 | Gadre et al. |
| 6,313,886 B1 | 11/2001 | Sugiyama |
| 6,330,335 B1 | 12/2001 | Rhoads |
| 6,353,672 B1 | 3/2002 | Rhoads |
| 6,370,543 B2 | 4/2002 | Hoffert et al. |
| 6,373,534 B1 | 4/2002 | Yasuki et al. |
| 6,377,972 B1 | 4/2002 | Guo et al. |
| 6,377,995 B2 | 4/2002 | Agraharam et al. |
| 6,388,714 B1 | 5/2002 | Schein et al. |
| 6,400,827 B1 | 6/2002 | Rhoads |
| 6,411,725 B1 | 6/2002 | Rhoads |
| 6,434,253 B1 | 8/2002 | Hayashi et al. |
| 6,463,585 B1 | 10/2002 | Hendricks et al. |
| 6,535,253 B2 | 3/2003 | Barton et al. |
| 6,546,556 B1 | 4/2003 | Kataoka et al. |
| 6,553,178 B2 | 4/2003 | Abecassis |
| 6,567,127 B1 | 5/2003 | Orr et al. |
| 6,587,821 B1 | 7/2003 | Rhoads |
| 6,590,996 B1 | 7/2003 | Reed et al. |
| 6,604,239 B1 | 8/2003 | Kohen |
| 6,642,939 B1 | 11/2003 | Vallone et al. |
| 6,642,966 B1 | 11/2003 | Limaye |
| 6,647,128 B1 | 11/2003 | Rhoads |
| 6,651,253 B2 | 11/2003 | Dudkiewicz et al. |
| 6,665,873 B1 | 12/2003 | Van Gestel et al. |
| 6,714,720 B1 | 3/2004 | Lightstone et al. |
| 6,760,916 B2 | 7/2004 | Holtz et al. |
| 6,918,133 B2 | 7/2005 | Lee |
| 8,516,374 B2 | 8/2013 | Fleischman et al. |
| 8,543,454 B2 | 9/2013 | Fleischman et al. |
| 8,600,984 B2 | 12/2013 | Fleischman et al. |
| 8,630,893 B2 | 1/2014 | Stibel et al. |
| 8,645,398 B2 | 2/2014 | Xia et al. |
| 8,751,461 B2 | 6/2014 | Abraham et al. |
| 8,775,252 B2 | 7/2014 | Wu et al. |
| 8,806,444 B1 * | 8/2014 | Podgorny ............... G06F 8/38 717/120 |
| 2002/0026635 A1 | 2/2002 | Wheeler et al. |
| 2002/0033842 A1 | 3/2002 | Zetts |
| 2002/0056121 A1 | 5/2002 | Ledbetter |
| 2002/0057297 A1 | 5/2002 | Grimes et al. |
| 2002/0085736 A1 | 7/2002 | Kalker et al. |
| 2002/0085737 A1 | 7/2002 | Kitamura |
| 2002/0087864 A1 | 7/2002 | Depovere et al. |
| 2002/0097984 A1 | 7/2002 | Abecassis |
| 2002/0105907 A1 | 8/2002 | Bruekers et al. |
| 2002/0124246 A1 | 9/2002 | Kaminsky et al. |
| 2002/0147990 A1 | 10/2002 | Lu et al. |
| 2002/0194195 A1 | 12/2002 | Fenton et al. |
| 2003/0004589 A1 | 1/2003 | Bruekers |
| 2003/0016756 A1 | 1/2003 | Steenhof et al. |
| 2003/0086587 A1 | 5/2003 | Haitsma et al. |
| 2003/0105870 A1 | 6/2003 | Baum |
| 2003/0123660 A1 | 7/2003 | Fletcher et al. |
| 2003/0234805 A1 | 12/2003 | Toyama et al. |
| 2004/0003394 A1 | 1/2004 | Ramaswamy |
| 2004/0015999 A1 | 1/2004 | Carlucci et al. |
| 2010/0016011 A1 | 1/2010 | Alen |
| 2010/0280641 A1 | 11/2010 | Harkness et al. |
| 2011/0035211 A1 | 2/2011 | Eden |
| 2012/0278328 A1 | 11/2012 | Samson et al. |
| 2013/0080348 A1 | 3/2013 | Pantaliano et al. |
| 2013/0198125 A1 | 8/2013 | Oliver et al. |
| 2013/0218885 A1 * | 8/2013 | Satyanarayanan ... G06Q 30/016 707/728 |

(56) References Cited

U.S. PATENT DOCUMENTS

| | | | |
|---|---|---|---|
| 2013/0325550 A1* | 12/2013 | Varghese | H04W 4/21 705/7.31 |
| 2013/0332604 A1 | 12/2013 | Seth et al. | |
| 2014/0122622 A1* | 5/2014 | Castera | H04L 51/32 709/206 |
| 2014/0173641 A1 | 6/2014 | Bhatia et al. | |
| 2014/0214978 A1 | 7/2014 | Splaine et al. | |
| 2014/0278933 A1 | 9/2014 | McMillan | |
| 2014/0298025 A1 | 10/2014 | Burbank et al. | |

OTHER PUBLICATIONS

International Searching Authority, "International Search Report and Written Opinion", issued in connection with International Patent Application No. PCT/US2015/053805, dated Jan. 14, 2016 (8 pages).

S. Wakamiya, R. Lee and K. Sumiya, "Crowd-Powered TV Viewing Rates: Measuring Relevancy between Tweets and TV Programs", dated 2011, pp. 390-401.

Nielsen Media Research, "Nielsen and NetRatings Launch National TV/Internet Fusion Database", PRNewswire.com, 2013 (3 pages).

United States Patent and Trademark Office, "U.S. Appl. No. 61/661,328," filed Jun. 18, 2012 (36 pages).

United States Patent and Trademark Office, "U.S. Appl. No. 61/871,243," filed Aug. 28, 2013 (25 pages).

United States Patent and Trademark Office, "Non-Final Office Action", issued in connection with U.S. Appl. No. 10/185,734, dated Mar. 17, 2004 (18 pages).

United States Patent and Trademark Office, "Final Office Action", issued in connection with U.S. Appl. No. 10/185,734, dated Jan. 27, 2005 (14 pages).

United States Patent and Trademark Office, "Non-Final Office Action", issued in connection with U.S. Appl. No. 10/185,734, dated Aug. 9, 2005 (17 pages).

Heuer et al., "Adaptive Multimedia Messaging based on MPEG-7—The M/\3 Box", Proc. Second Int'l symposium on Mobile Multimedia Systems & Applications, dated Nov. 9-10, 2000 (pp. 6-13).

International Searching Authority, "International Search Report", issued in connection with International Patent Application No. PCT/US03/20296, dated Apr. 9, 2004 (6 pages).

International Searching Authority, "Written Opinion", issued in connection with International Patent Application No. PCT/US03/20296, dated Dec. 6, 2004 (6 pages).

International Searching Authority, "International Preliminary Report on Patentability", issued in connection with International Patent Application No. PCT/US2015/053805, dated Apr. 13, 2017 (6 pages).

* cited by examiner

FUSING ONLINE MEDIA MONITORING DATA WITH SECONDARY ONLINE DATA FEEDS TO GENERATE RATINGS DATA FOR ONLINE MEDIA EXPOSURE

FIELD OF THE DISCLOSURE

This disclosure relates generally to media monitoring and, more particularly, to fusing online media monitoring data with secondary online data feeds to generate ratings data for online media exposure.

BACKGROUND

Audience measurement systems that determine overnight ratings data characterizing exposure to broadcast media, such as broadcast television programs, broadcast radio programs, etc., are known. However, exposure to media is no longer limited to broadcast media sources. For example, the use of computing platforms, such as smartphones, tablet computers, notebook computers, desktop computers, etc., to stream and/or download online media, such as content, advertisements, etc., has become commonplace. Existing overnight ratings data may not adequately characterize such exposure to online media.

BRIEF DESCRIPTION OF THE DRAWINGS

Wherever possible, the same reference numbers will be used throughout the drawing(s) and accompanying written description to refer to the same or like parts, elements, etc.

DETAILED DESCRIPTION

Figure 1:
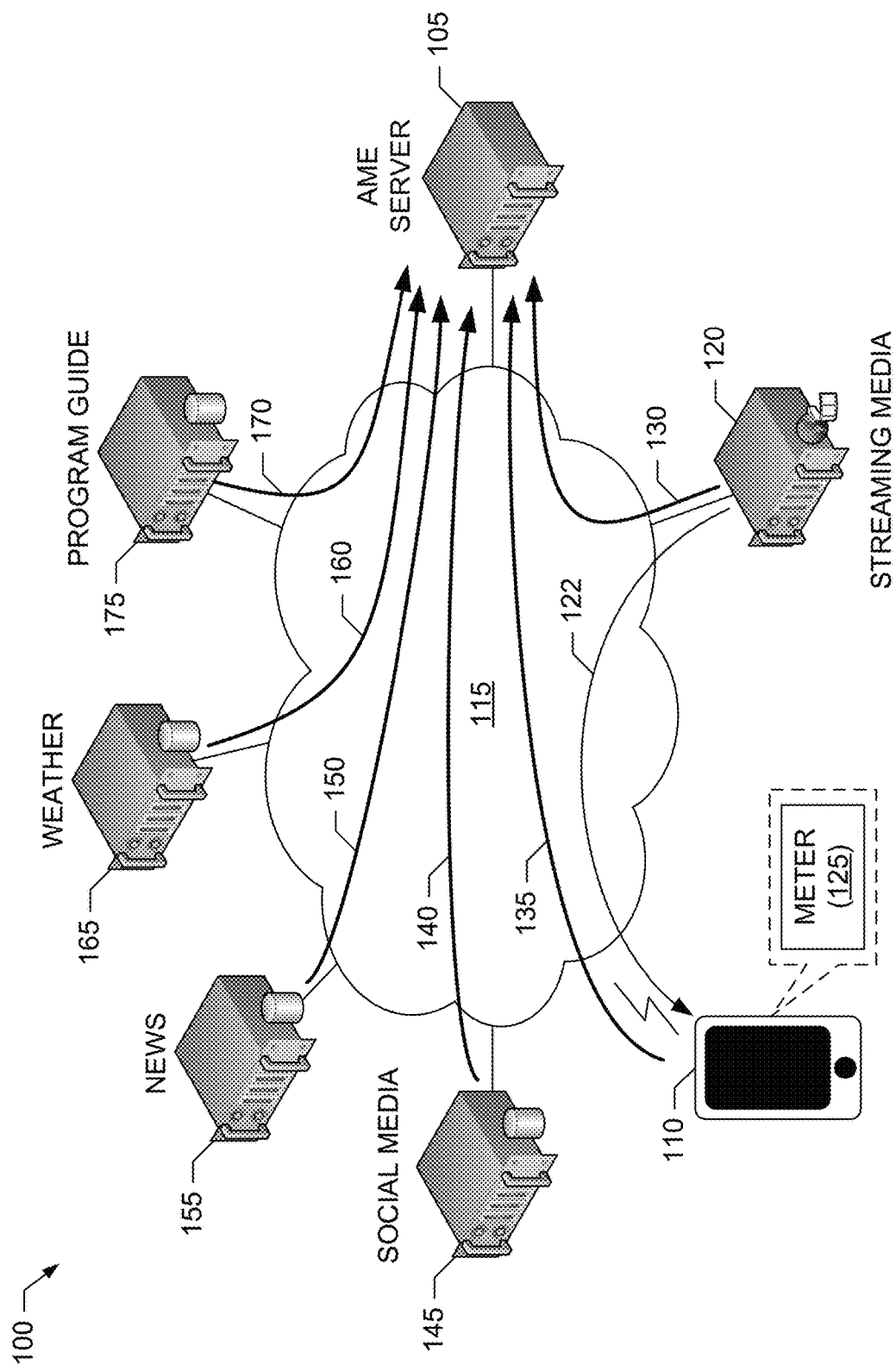
FIG. 1 is a block diagram of an example environment of use including an example audience measurement entity server to fuse online media monitoring data with secondary online data feeds in accordance with the teachings of this disclosure to generate ratings data for online media exposure.

Methods, apparatus, systems, storage media, etc., to fuse online media monitoring data with secondary online data feeds to generate ratings data for online media exposure are disclosed herein. Example methods disclosed herein to determine ratings data for online media exposure include accessing timestamps included in monitoring data obtained by monitoring exposure to online media. Such disclosed example methods also include searching a secondary online data feed using the timestamps included in the monitoring data for data entries associated with exposure to the online media. Such disclosed example methods further include fusing the data entries from the secondary online data feed with the monitoring data to generate the ratings data for online media exposure.

In some such examples, the monitoring data includes media identifiers identifying media that was presented and/or or accessed via a group of online computing platforms. In some such examples, the timestamps are associated with the media identifiers. In some such examples, respective ones of the timestamps indicate when respective media identified by associated ones of the media identifiers have been presented and/or accessed via the group of online computing platforms.

Some such example methods further include receiving at least a portion of the monitoring data from a monitoring device that is to monitor media exposure associated with a first one of the online computing platforms. Additionally or alternatively, some such example methods further include receiving at least a portion of the monitoring data from a server that is to provide first online media to the first one of the online computing platforms.

In some such examples, the monitoring data includes instances of the first media identifier being associated with respective ones of the timestamps. In some such examples, searching the secondary online data feed includes selecting first data entries from the secondary online data feed having entry times corresponding to (e.g., within one or more time windows of) the respective ones of the timestamps associated with the first media identifier in the monitoring data. In some such examples, searching the secondary online data feed also includes selecting second data entries from the first data entries based on the first media identifier. In some such examples, fusing the data entries with the monitoring data includes combining the monitoring data and the second data entries to determine first ratings data characterizing exposure to first media identified by the first media identifier.

In some such examples, the secondary online data feed comprises a social media feed, and selecting the second data entries includes selecting the first data entries from the secondary online data feed having content corresponding to the first media identified by the first media identifier to be the second data entries. In some such examples, combining the monitoring data and the second data entries includes using the monitoring data to determine a time varying audience of the first media. In some such examples, combining the monitoring data and the second data entries also includes using the second data entries to determine a time varying social impact of the first media. In some such examples, combining the monitoring data and the second data entries further includes aligning values of the time varying audience with corresponding values of the time varying social impact based on the timestamps included in the monitoring data.

In some such examples, using the monitoring data to determine the time varying audience of the first media includes using the media identifiers and the timestamps included in the monitoring data to determine a time varying number of the computing platforms that accessed and/or presented the first media over a first period of time.

In some such examples, using the second data entries to determine the time varying social impact of the first media includes determining, for a first one of the timestamps associated with the first media identifier, a first number of distinct social media users that authored a first subset of the second data entries corresponding to the first one of the timestamps. In some such examples, using the second data entries to determine the time varying social impact of the first media also includes determining, for a second one of the timestamps associated with the first media identifier, a second number of distinct social media users that authored a second subset of the second data entries corresponding to the second one of the timestamps.

Additionally or alternatively, in some such examples, using the second data entries to determine the time varying social impact of the first media further includes combining metrics (e.g., numbers of subscribers, numbers of followers, numbers of friends, etc.) characterizing respective reaches of respective ones of the social media users in the first number of distinct social media users to determine a first value characterizing social media reach of the first media at a first time corresponding to the first one of the timestamps associated with the first media identifier. In some such examples, using the second data entries to determine the time varying social impact of the first media also includes combining metrics (e.g., numbers of followers, numbers of friends, etc.) characterizing respective reaches of respective ones of the social media users in the second number of distinct social media users to determine a second value characterizing the social media reach of the first media at a second time corresponding to the second one of the timestamps associated with the first media identifier.

Additionally or alternatively, in some such examples, using the second data entries to determine the time varying social impact of the first media includes combining metrics (e.g., numbers of likes, numbers of dislikes, numbers of thumbs-up, numbers of thumbs-down, etc.) characterizing feedback to respective ones of a first subset of the second data entries corresponding to a first one of the timestamps to determine a first value characterizing social media response to the first media at a first time associated with the first one of the timestamps. In some such examples, using the second data entries to determine the time varying social impact of the first media also includes combining metrics (e.g., numbers of likes, numbers of dislikes, numbers of thumbs-up, numbers of thumbs-down, etc.) characterizing feedback to respective ones of a second subset of the second data entries corresponding to a second one of the timestamps to determine a second value characterizing the social media response to the first media at a second time associated with the second one of the timestamps.

Additionally or alternatively, in some such examples, using the second data entries to determine the time varying social impact of the first media includes processing respective ones of a first subset of the second data entries corresponding to a first one of the timestamps to determine a first value characterizing social media response to the first media at a first time associated with the first one of the timestamps. For examples, processing of the first subset of the second data entries can include detecting positive keywords and/or phrases in the data entries, detecting negative keywords and/or phrases in the data entries, etc., and processing such positive and negative keywords and/or phrases to determine whether the first media received a positive response or a negative response among social media users at the first time associated with the first one of the timestamps. In some such examples, using the second data entries to determine the time varying social impact of the first media also includes processing respective ones of a second subset of the second data entries corresponding to a second one of the timestamps to determine a second value characterizing the social media response to the first media at a second time associated with the second one of the timestamps. For examples, processing of the second subset of the second data entries can include detecting positive keywords and/or phrases in the data entries, detecting negative keywords and/or phrases in the data entries, etc., and processing such positive and negative keywords and/or phrases to determine whether the first media received a positive response or a negative response among social media users at the second time associated with the second one of the timestamps.

In some disclosed example methods, the monitoring data includes instances of the first media identifier being associated with respective ones of the timestamps, and the secondary online data feed includes at least one of a news feed or a weather feed. In some such examples, searching the secondary online data feed includes selecting data entries from the news feed and/or the weather feed having entry times corresponding to (e.g., within one or more time windows of) the respective ones of the timestamps associated with the first media identifier in the monitoring data. In some such examples, fusing the data entries from the secondary online data feed with the monitoring data includes aligning the monitoring data with the first data entries from the news feed and/or the weather feed based on the timestamps.

These and other example methods, apparatus, systems, storage media, etc., to fuse online media monitoring data with secondary online data feeds to generate ratings data for online media exposure are disclosed in further detail below.

As noted above, the use of computing platforms, such as smartphones, tablet computers, notebook computers, desktop computers, etc., to stream and/or download online media has become commonplace. Accordingly, enhancing audience measurement campaigns, which may already determine overnight ratings data characterizing exposure to broadcast media, to include monitoring of online media impressions, such as impressions related to presentations of content, advertisements, etc., on computing platforms can be valuable to content providers, advertisers, etc. Moreover, with the increasing popularity of on-demand access to media via the streaming and/or downloading of online media, comes a corresponding desire on the part of media providers, advertisers, service provides, distributors, manufacturers, etc., to obtain real-time feedback concerning the exposure to the online media. Although providing overnight ratings data enhanced to incorporate online media monitoring along with the more traditional monitoring of broadcast media sources can be a valuable commodity to media providers, advertisers, etc., the time lag associated with such overnight ratings data runs counter to the desire for real-time ratings data.

Furthermore, data feeds from secondary online data sources, such as social media sources, news sources, weather sources, etc., can provide valuable insight into not only what media is being accessed in real-time, but how that media is being perceived. For example, social media users often comment on media programs in real-time as the media is being presented (e.g., broadcasted, streamed, etc.) and/or shortly thereafter. Such comments can indicate whether the media is being perceived positively or negatively by the users. Additionally or alternatively, current news events and/or weather events can affect, in real-time, the media accessed by online users. Thus, being able to fuse data feeds from secondary sources with online media monitoring data, in real-time, which may not be possible with existing overnight ratings systems, can provide a level of real-time feedback desired by today's media providers, advertisers, etc.

Examples disclosed herein to generate ratings data for online media exposure by fusing online media monitoring data with secondary online data feed(s) solve at least some of the technical problems associated with obtaining real-time ratings data characterizing the exposure to online media. For example, to solve the problem of providing ratings data for online media, some example solutions disclosed herein take advantage of the network connection(s) established by a computing platform to receive (e.g., stream and/or download) online media to report monitoring data, which characterizes exposure to that media, from the computing platform to an audience measurement entity. Accordingly, example solutions disclosed herein are able to use the already established network connection(s) to report the monitoring data in real-time as the online media is being received (e.g., and presented), unlike some prior monitoring techniques for broadcast media, which may buffer the monitoring data and wait until a certain time-of-day (e.g., late evening and/or early morning) to establish a network connection and report the monitoring data to the audience measurement entity. Furthermore, because the example solutions disclosed herein receive monitoring data from computing platform(s) accessing and/or presenting online media, such solutions are able to turn-around and process such real-time monitoring data to determine ratings data in real-time.

Also, in some example solutions disclosed herein, the computing platform receiving online media (and/or a meter associated with the computing platform) is able to determines the monitoring data in real-time as the online media is received and/or presented using information already provided in the online media stream/data, in contrast with some prior monitoring techniques for broadcast media, which may require post-processing of media signals (e.g., audio and/or video signals, etc.) to determine the monitoring data. For example, online media monitoring data may include media identifiers, which are obtained from the online media stream/data and which identify the online media accessed and/or presented by the computing platform. In some examples, the media monitoring data also includes timestamps associated with the media identifiers and indicating when the respective online media identified by the media identifiers was accessed and/or presented. In some such example solutions, because the monitoring data is reported in real-time to the audience measurement entity, the audience measurement entity is able to update its ratings data in real-time. For example, when new monitoring data is received in real-time, the audience measurement entity can use the media identifiers and timestamps included in the monitoring data to update (e.g., in real-time) a count of a number of computing platforms accessing/presenting given media at a given time (e.g., a current time), during a given time window (e.g., including a current time), etc.

Additionally or alternatively, to solve the problem of how to fuse secondary source data feeds with online media monitoring data, some example solutions disclosed herein use the timestamps included in online media monitoring data characterizing the exposure to online media, and timestamps or other timing information associated with data entries obtained from one or more secondary data feeds, to combine, augment, and/or otherwise fuse the online media monitoring data with the secondary data feeds to determine real-time ratings data for online media. For example, the data entries from the secondary data feeds may correspond to the social media posts, social media status updates, tweets, news alerts, weather alerts, etc., and the timing information associated with data entries may correspond to timestamps indicating when the social media posts, status updates, tweets, news alerts, weather alerts, etc., were posted, updated, etc. In some example solutions disclosed herein, the timestamps included in the online media monitoring data are used to select secondary feed data entries having times corresponding to (e.g., within one or more time windows of) the times when online media identified in the monitoring data was accessed and/or presented, and to align the selected secondary feed data entries with the specific instances when such online media was accessed and/or presented. In some examples, by performing an initial search of the secondary feed data entries using the timestamps, example solutions disclosed herein can quickly reduce the number of secondary feed data entries to be processed to a more manageable amount. Furthermore, in some disclosed example solutions, the selection and alignment of secondary feed data entries with monitoring data entries occurs in real-time (e.g., as new monitoring data is received in real-time) such that the correlation(s) between the secondary data feeds and online media exposure can readily be observed.

In some example solutions disclosed herein, the media identifiers included in the online media monitoring data are used to parse (e.g., extract) information from the data entries selected, based on the timestamps, from the secondary data feed(s), which is further processed to determine time-varying metrics to be associated with (e.g., fused with) time varying audience data determined from the online media monitoring data. Some example solutions disclosed herein process the media identifiers and timestamps included in the online media monitoring data to determine time varying audience data for different media identified by the media identifiers included in the monitoring data (e.g., such as a count, updated in real-time, of a number of computing platforms accessing/presenting given identified media at a given time (e.g., a current time), during a given time window (e.g., including a current time), etc.). Some such example solutions also process the data entries selected, based on the monitoring data timestamps, from the secondary data feed(s) to determine time varying social impact metrics that can be fused with (e.g., aligned, in time, with) the time varying audience data using the timestamps included in the online media monitoring data. As disclosed in further detail below, such social impact metrics can include, but are not limited to, (i) a social impact metric specifying a number of distinct social media users that commented on particular online media at time(s) corresponding to the timestamps in the monitoring data, (ii) a social impact metric specifying a social media reach of particular online media at time(s) corresponding to the timestamps in the monitoring data, (iii) social impact metric specifying a social media feedback and/or a social media response to particular online media at time(s) corresponding to the timestamps in the monitoring data, etc.

Turning to the figures, a block diagram of an example environment of use 100 including an example audience measurement entity (AME) server 105 to fuse online media monitoring data with secondary online data feeds to generate ratings data for online media exposure as disclosed herein is illustrated in FIG. 1. The example AME server 105 of FIG. 1 generates ratings data to characterize online media exposure via one or more computing platforms, such as an example consumer media device 110, in communication with one or more networks, such as an example network 115. In the example environment of use 100, the consumer media device 110 is in communication with the network 115 and, as such, is able to access online media from one or more media servers, such as an example streaming media server 120. For example, the consumer media device 110 is able to access the streaming media server 120 and/or other servers (e.g., an ad server, etc.) via the network 115, and receive and present media (represented by a directed line 122 in FIG. 1), such as movies, television program, advertisements, etc., streamed and/or otherwise obtained from the streaming media server 120 and/or other servers. In some such examples, the ratings data generated by the AME server 105 characterizes (potentially in real-time) the sizes of audiences, compositions of audiences, etc., of different media accessed from servers, such as the streaming media server 120, and/or presented by the consumer media device(s) 110, as well as how such audiences vary over time.

As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

In the illustrated example of FIG. 1, the AME server 105 can be implemented by any type(s), number(s) and/or combination of physical and/or virtual servers and/or platforms. The example consumer media device 110 of FIG. 1 can be implemented by any computing device, apparatus, system, etc., such as a mobile phone or smartphone, a tablet computer (e.g., an Apple iPad™), a notebook computer, a desktop computer, a gaming device (e.g., a Nintendo 3DS™), a gaming console (e.g., a Microsoft Xbox 360™, a Playstation PS4™, a Nintendo Wii U™, etc.), a personal digital assistant (PDA), etc. The example network 115 of FIG. 1 can be implemented by any type(s), number(s) and/or combination of computing networks, such as a mobile cellular network, a wireless local area network (WLAN), such as a WiFi network, a proprietary wireless network, the Internet, etc. The example streaming media server 120 of FIG. 1 can be implemented by a streaming media service, such as Netflix, Hulu, Amazon, etc., accessible from the consumer media device 110, an advertisement server, a news portal hosting media, a web portal hosting media, etc. As such, the streaming media server 120 can be implemented by any type(s), number and/or combination of physical and/or virtual servers and/or platforms capable of streaming media over a network to a media device, such as the consumer media device 110.

To generate ratings data, the AME server 105 of the illustrated example receives online media monitoring data from, for example, the streaming media server 120 and/or one or more other servers providing online media to the consumer media device(s) 110. Additionally or alternatively, in some examples, the AME server 105 receives online media monitoring data from one more meters, such as an example meter 125, monitoring media exposure associated with the consumer media device(s) 110. In the illustrated example of FIG. 1, the online media monitoring data received by the AME server 105 from the streaming media server 120, and/or one or more other servers, is represented by a directed line 130, whereas the online media monitoring data received by the AME server 105 from the meter(s) 125 is represented by a directed line 135. In some examples, the meter(s) 125 and/or the streaming media server 120 and/or other server(s) are able to report the media monitoring data 130/135 in real-time to the AME server 105 using network connections already established with the network 115 to carry the streaming media being monitored. In some examples, the online media monitoring data reported to the AME server 105 includes media identifiers identifying the online media accessed and/or presented by the consumer media device(s) 110. In some examples, the online media monitoring data includes timestamps associated with the media identifiers to indicate when the media identified by the media identifiers was accessed, presented, etc.

For example, the online media monitoring data may include a sequence of data entries containing, among other things, respective media identifier and timestamp pairs indicating the particular media accessed and/or presented by the consumer media device(s) 110 at regular or irregular time intervals (e.g., such as every 10 seconds, 15 seconds, 30 seconds, etc.) and/or when certain events occur (e.g., such as when access and/or presentation of particular media is initiated, terminated, paused, etc.), etc., and/or combinations thereof. For example, the media identifiers included in the online media monitoring data may be obtained from metadata accompanying the media provided to the consumer media device(s) 110 (e.g., such as media identification data included in ID3 tags accompanying the media, and/or embedded in the media, and/or included in the headers and/or other portions of the transport streams conveying the media, etc.) and detected by the server(s) 120 when the media is accessed and/or by the meter(s) 125 when the media is received. In some such examples, the timestamps included in the online media monitoring data enable the AME server 105 to perform real-time and/or non-real-time identification of the media being accessed and/or presented by the consumer media device(s) 110 at different times. Moreover, the timestamps enable the AME server 105 to align the online media monitoring data for different consumer media device 110, in time, such that the AME server 105 can generate ratings data characterizing, for example, audiences of particular online media at different times.

In the illustrated example of FIG. 1, the meter 125 can be implemented by any type(s), number(s) and/or combination of application(s) (e.g., apps) executing on the consumer media device 110, and/or monitoring devices electrically coupled to (e.g., via an electrical data port), optically coupled to (e.g., via an electrical optical port) and/or otherwise in communication with the consumer media device 110, and capable of determining monitoring data, such as the monitoring data described above, characterizing exposure to online media at the consumer media device 110. In some examples, the meter 125 is an application that a service provider automatically installs on the consumer media device 110 and/or causes to be automatically downloaded to the consumer media device 110 via the network 115. In some examples, the streaming media server 120, or another server, causes the meter 125 to be downloaded to the consumer media device 110 as a condition to access streaming media. Such meters may be referred as non-panelist meters to distinguish them from panelist meters that are provided to panelists statistically selected by an AME for inclusion in an audience measurement panel (and which may include more extensive media monitoring functionality than the non-panelist meters). However, in some examples, the meter 125 may correspond to a panelist meter provided by an AME (e.g., a meter supplied to the service provider by the AME for downloading as a condition of access to streaming media). As such, the online media monitoring solutions disclosed herein can be used to monitor a computing platform regardless of whether the computing platform is associated with an AME panelist.

In the example environment of use 100 of FIG. 1, the AME server 105 fuses the online media monitoring data obtained from the server(s) 120 and/or meter(s) 125 with information from one or more secondary online data feeds to generate the ratings data characterizing online media exposure associated with the consumer media devices 110. For example, in the environment of use 100 of FIG. 1, such secondary online data feeds can correspond to (i) one or more social media data feeds (represented by a directed line 140) obtained from one or more social media servers 145, (ii) one or more news data feeds (represented by a directed line 150) obtained from one or more news servers 155, (iii) one or more weather data feeds (represented by a directed line 160) obtained from one or more weather servers 165, (iv) one or more program guide data feeds (represented by a directed line 170) obtained from one or more program guide servers 175, etc., and/or any combinations(s) thereof. In some examples, the AME server 105 uses the timestamps included in the online media monitoring data 130 and/or 135 to fuse (e.g., combine, augment, etc.) the online media monitoring data 130/135 with the secondary online data feed(s) 140, 150, 160 and/or 170. For example, the AME server 105 may use the timestamps included in the online media monitoring data 130/135 to select data entries from the secondary online data feed(s) 140, 150, 160 and/or 170 having times corresponding to (e.g., within one or more time windows of, such as windows of 5 seconds, 10 seconds, 15 seconds, 30 seconds, 1 minute, several minutes, etc.) the timestamps indicating when online media identified in the monitoring data was accessed and/or presented. In such examples, the AME server 105 may further use the timestamps included in the online media monitoring to align the selected secondary feed data entries with specific instances in time when the different online media identified in the monitoring data was accessed and/or presented. In this way, the AME server 105 of the illustrated example is able to align, in time, online media exposure, as represented by the online media monitoring data 130/135, with relevant information obtained and/or determined from the secondary online data feed(s) 140, 150, 160 and/or 170.

In some examples, the AME server 105 further uses the media identifiers (and/or other information) included in the online media monitoring data 130/135 to parse the data entries selected, based on the monitoring data timestamps, from the secondary data feed(s) 140, 150, 160 and/or 170 to identify and extract information from the selected data entries that is further related to the media identified by the media identifiers. As such, the AME server 105 of the illustrated example implements a two phase approach to obtain information from the secondary data feed(s) 140, 150, 160 and/or 170. In the first phase, the example AME server 105 uses the timestamps included in the media monitoring online media monitoring data 130/135 to reduce the universe of data entries from the secondary data feed(s) 140, 150, 160 and/or 170 to a more manageable number having times corresponding to (e.g., within respective window(s) of) the timestamps included in the media monitoring online media monitoring data 130/135. In the second phase, the example AME server 105 uses the media identifier(s) associated with a particular timestamp (or, for example, range of timestamps) in the online media monitoring data 130/135 to parse the resulting smaller set of data entries from the secondary data feed(s) 140, 150, 160 and/or 170 to obtain information from the secondary data feed(s) 140, 150, 160 and/or 170 relevant to media identified by the media identifier(s) and associated with time(s) corresponding to that timestamp. In some examples, this information is then further processed to determine time-varying metrics to be associated with (e.g., aligned in time with) time varying audience metrics and/or other ratings metrics determined by the AME server 105 from the online media monitoring data 130/135. Examples of such processing are described in further detail below in connection with FIG. 2.

Figure 2:
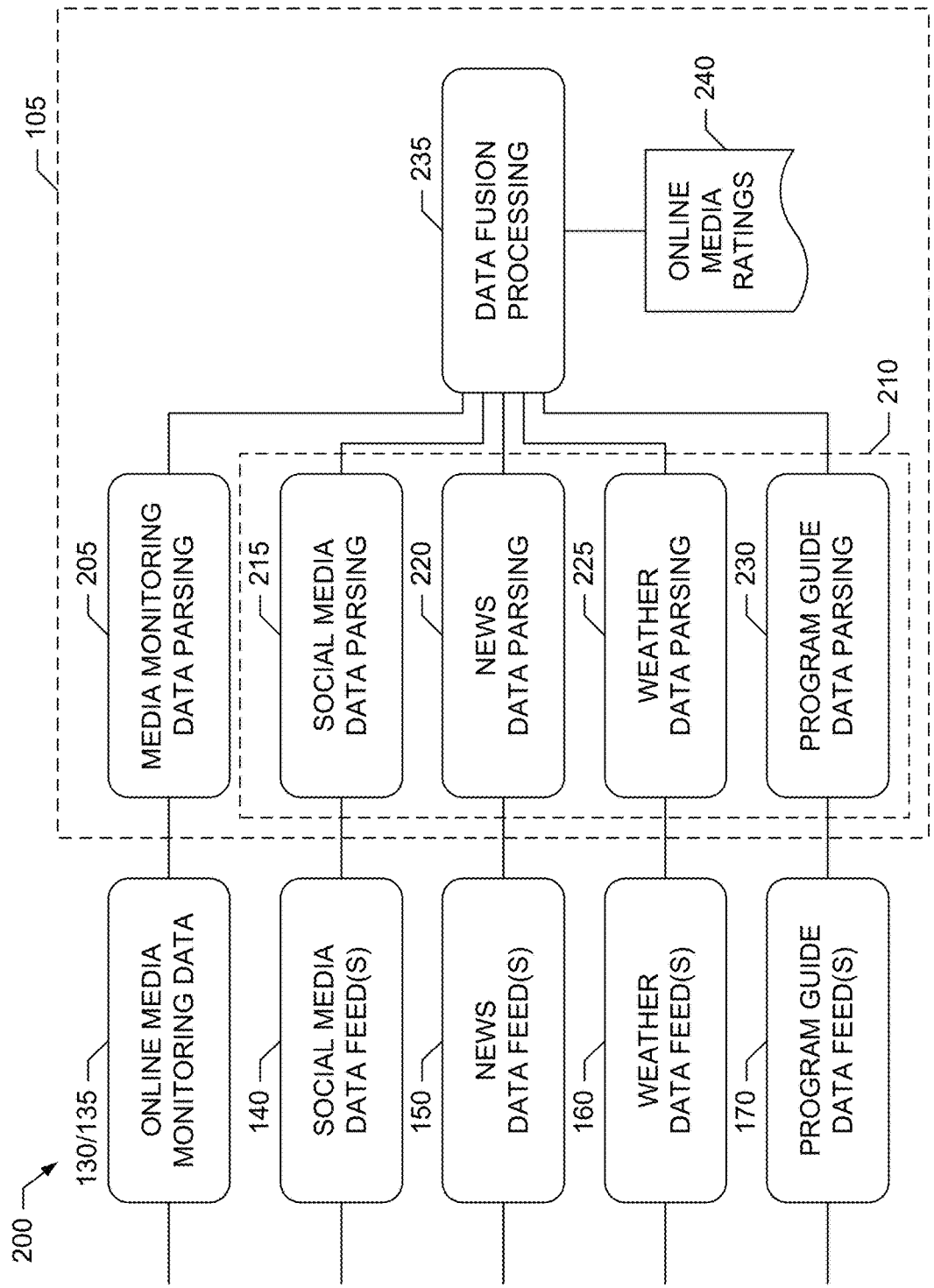
FIG. 2 depicts an example process to fuse online media monitoring data with secondary online data feeds to generate ratings data for online media exposure in the first example environment of use of FIG. 1.

An example procedure 200 capable of being performed by the example AME server 105 to fuse online media monitoring data with secondary online data feeds to generate ratings data for online media exposure in the example environment of use 100 of FIG. 1 is illustrated in FIG. 2. In the example procedure 200 of FIG. 2, the AME server 105 performs an example media monitoring data parsing process 205 on the received online media monitoring data 130 and/or 135. For example, and as described above, the online media monitoring data 130/135 may include media identifiers identifying media that was presented and/or accessed via a group of one or more online computing platforms (e.g., such as the consumer media device 110), and timestamps associated with the media identifiers such that respective ones of the timestamps indicate when respective media identified by associated ones of the media identifiers was presented and/or accessed via the group of online computing platforms. For example, for a particular media identifier, the online media monitoring data 130/135 may include a sequence of data entries including the particular media identifier, an identifier of the consumer media device 110, and a sequence of timestamps to indicate when the media identified by the particular media identifier was accessed and/or presented by the consumer media device 110. In such examples, the AME server 105 performs the media monitoring data parsing process 205 to, for example, determine the media identifiers and associated timestamps included in the online media monitoring data 130/135. In some such examples, the media monitoring data parsing process 205 identifies instances of a particular media identifier and its associated timestamps to, for example, determine a time varying audience of the online media identified by the particular media identifier (e.g., by identifying which consumer media device(s) 110 were associated with exposure to the particular media and determining when the particular media was accessed and/or presented and, thus, likely consumed).

For example, the media monitoring data parsing process 205 can examine the media identifiers and associated timestamps, along with identifiers included in the media monitoring data to identify the consumer media devices 110 associated with different media monitoring data entries, to determine a count of the number of the consumer media devices 110 accessing/presenting given media at a given time (e.g., a current time), during a given time window (e.g., including a current time), etc. In some examples, such a count is used to represent an audience of the given media (e.g., in terms of a number of devices accessing/presenting the media), which is variable over time (and, in some examples, updateable in real-time) as new media monitoring data is received by the media monitoring data parsing process 205.

In the example procedure 200 of FIG. 2, the AME server 105 also performs one or more example secondary online data feed parsing processes 210 on received secondary online data feeds. For example, and as illustrated in FIG. 2, the example AME server 105 performs one or more of an example social media data parsing process 215 on the example social media data feed(s) 140 obtained from (e.g., requested from, received from, accessed at, etc.) the social media server(s) 145, an example news data parsing process 220 on the example news data feed(s) 150 obtained from (e.g., requested from, received from, accessed at, etc.) the news server(s) 155, an example weather data parsing process 225 on the example weather data feed(s) 160 obtained from (e.g., requested from, received from, accessed at, etc.) the weather server(s) 165, and/or an example program guide data parsing process 230 on the example program guide data feed(s) 170 obtained from (e.g., requested from, received from, accessed at, etc.) the program guide server(s) 175. For example, the AME server 105 uses the timestamps included in the online media monitoring data 130/135 to query one or more of the social media server(s) 145, the news server(s) 155, the weather server(s) 165 and/or the program guide server(s) 175 to request data entries having times corresponding to (e.g., equal to or within a window of) the timestamps included in the online media monitoring data 130/135. In such examples, the AME server 105 then performs one or more of the secondary online data feed parsing processes 210 on the received data entries forming the secondary online data feeds to extract information from the data entries and store the extracted information in a database or other searchable storage for use in generating ratings data for online media exposure.

In some examples, a social media data feed 140 includes social media data entries corresponding to respective social media posts, status updates, tweets, etc., which also include time information, such as timestamps, indicating when each respective social media post, status update, tweet, etc., was posted, updated, etc. In such examples, the social media data parsing process 215 performed by the AME server 105 parses the social media data feed 140 to identify the contents of the different data entries included in the social media data feed 140 and the times (e.g., timestamps) associated with the different social media data entries. For example, given a particular format of the data entries included in the social media data feed 140, the social media data parsing process 215 can use the format to parse (e.g., extract) different pieces of information from a data entry, such as a time (e.g., timestamp) for the entry, the contents (e.g., typed text, embedded hyperlinks, etc.) of the data entry, etc. In some examples, once the social media data parsing process 215 determines the time for a given data entry, the social media data parsing process 215 further uses media identifier(s) from the online media monitoring data 130/135 that is/are associated with a timestamp corresponding to the time of the data entry to further parse the data entry to determine whether information matching the media identifier is included in the contents of the data entry, which indicates whether the particular data entry is relevant to the media identified by the media identifier. In some examples, the social media data parsing process 215 additionally or alternatively parses the data entries of the social media data feed 140, and/or performs queries of the social media server(s) 145 using information parsed from the data entries, to identify the social media user(s) associated with (e.g., the user(s) who posted, submitted, authored, updated, etc.) the different social media data entries, the reach of the respective social media user(s) (e.g., such as the number of subscribers for each of the social media user(s), the number of followers for each of the social media user(s), the number of friends of each of the social media user(s), etc.), the feedback to the respective social media data entries (e.g., such as the numbers of likes, numbers of dislikes, numbers of thumbs-up, numbers of thumbs-down, etc. associated with each of the social media data entries), etc., or any combination(s) thereof.

In some examples, a news data feed 150 includes news data entries corresponding to respective news articles, news bulletins, press releases, etc., and which include time information, such as timestamps, indicating when each respective news article, news bulletin, press release, etc., was posted, updated, etc. In such examples, the news data parsing process 220 performed by the AME server 105 parses the news data feed 150 to identify the contents of the different data entries included in the news data feed 150 and the times (e.g., timestamps) associated with the different news data entries. For example, given a particular format of the data entries included in the news data feed 150, the news data parsing process 220 can use the format to parse (e.g., extract) different pieces of information from a data entry, such as a time (e.g., timestamp) for the entry, the contents (e.g., typed text, embedded hyperlinks, etc.) of the data entry, etc. In some such examples, the news data parsing process 220 parses the data entries of the news data feed 150 using the format to identify data entries associated with news alerts, breaking news, and/or other news-related events.

In some examples, a weather data feed 160 includes weather data entries corresponding to respective weather forecasts, weather alerts, etc., and which include time information, such as timestamps, indicating when each respective weather forecast, weather alert, etc., was posted, updated, etc. In such examples, the weather data parsing process 225 performed by the AME server 105 parses the weather data feed 160 to identify the contents of the different data entries included in the weather data feed 160 and the times (e.g., timestamps) associated with the different weather data entries. For example, given a particular format of the data entries included in the weather data feed 160, the weather data parsing process 225 can use the format to parse (e.g., extract) different pieces of information from a data entry, such as a time (e.g., timestamp) for the entry, the contents (e.g., typed text, embedded hyperlinks, etc.) of the data entry, etc. In some such examples, the weather data parsing process 225 parses the data entries of the weather data feed 160 using the format to identify data entries associated with weather alerts and/or other weather-related events, such as weather watches (e.g., tornado watches, hurricane watches, etc.), weather warnings (e.g., such as tornado watches, tornado warnings, etc.).

In some examples, a program guide data feed 170 includes program guide data entries corresponding to broadcast schedules for different media programs (e.g., television programs, radio programs, on-demand programs, etc.), programming announcements (e.g., such as program premiers, program interruptions, etc.), etc., and which include time information, such as timestamps, indicating when each schedule, announcement, etc., was posted, updated, etc. In such examples, the program guide data parsing process 230 performed by the AME server 105 parses the program guide data feed 170 to identify the contents of the different data entries included in the program guide data feed 170 and the times (e.g., timestamps) associated with the different program guide data entries. For example, given a particular format of the data entries included in the program guide data feed 170, the program guide data parsing process 230 can use the format to parse (e.g., extract) different pieces of information from a data entry, such as a time (e.g., timestamp) for the entry, the contents (e.g., typed text, embedded hyperlinks, etc.) of the data entry, etc. In some such examples, the program guide data parsing process 230 parses the data entries of the program guide data feed 170 using the format to identify data entries associated with programming announcements and/or other program-related events (e.g., such as special programming offers, contests, etc.).

In the example procedure 200 of FIG. 2, the AME server 105 performs an example data fusion process 235 on the parsed media monitoring data obtained from the monitoring data parsing process 205 and the parsed secondary feed information obtained from one or more of the secondary online data feed parsing processes 210 to determine example online media ratings 240. In some examples, the data fusion process 235 accesses the timestamps and media identifiers parsed from the online media monitoring data 130/135 using the monitoring data parsing process 205. In such examples, the data fusion process 235 then searches, as described in further detail below, the data entries parsed by the secondary online data feed parsing process(es) 210 from one or more of the secondary online data feeds 140, 150, 160 and/or 170 using at least the timestamps obtained from the online media monitoring data 130/135 to identify the secondary data feed entries that may be associated with exposure to the online media (e.g., at least based on time). In such examples, the data fusion process 235 then fuses, as described in further detail below, the data entries from the secondary online data feed with the monitoring data to generate the ratings data 240 characterizing online media exposure.

In some examples, the data fusion process 235 performs such data fusion by first selecting relevant data entries parsed by the secondary online data feed parsing process(es) 210 from the one or more of the secondary online data feeds 140, 150, 160 and/or 170 as follows. To select the relevant data entries, the example data fusion process 235 identifies the timestamps included in the media monitoring data entries for a particular media identifier. Next, the example data fusion process 235 selects, from the one or more of the secondary online data feeds 140, 150, 160 and/or 170, a first group of data entries having entry times (e.g., timestamps) corresponding to (e.g., equal to or within one or more time window(s) of, etc.) the timestamps included in the media monitoring data entries for the particular media identifier. Next, the example data fusion process 235 selects, from the previously selected first group of secondary data feed entries, a second group of data entries based on the particular media identifier being examined. For example, the data fusion process 235 may select those entries in the first group of secondary data feed entries having content corresponding to particular media associated with a particular media identifier (e.g., such as entries having content matching some or all of the information conveyed by particular media identifier, such as a name of the media, a source of the media, a character in the media, and actor/actress in the media, etc.) to be the second group of data entries. The example data fusion process 235 then combines, augments, and/or otherwise fuses the monitoring data 130/135 with the second group of data entries selected from the secondary online data feeds 140, 150, 160 and/or 170 to generate the ratings data 240.

For example, to generate the online media ratings 240, the data fusion process 235 of the illustrated example determines audience data for particular online media using the monitoring data 130/135, and fuses this audience data with information obtained and/or determined from the second group of data entries selected, as described above, from the secondary online data feeds 140, 150, 160 and/or 170. In some examples, to determine audience data, the data fusion process 235 uses the media identifiers and timestamps obtained from the monitoring data parsing process 205 to determine time varying audience(s) of the one or more different media identified by the media identifiers in the online media monitoring data 130/135. In some such examples, the data fusion process 235 may examine the data entries of the online media monitoring data 130/135 corresponding to a particular media identifier and use the timestamps and consumer media device identifiers included in those records to determine a time varying a count of the number of the consumer media devices (e.g., representing the audience) that accessed and/or presented, over a given period of time, the particular media identified by the particular media identifier. This time varying number of consumer media devices can represent the time varying audience of the particular media identified by the particular media identifier.

In some examples, the data fusion process 235 fuses, as follows, information obtained from the selected data entries from the secondary online data feeds 140, 150, 160 and/or 170 (e.g., such as the second group of data entries described above) with the time varying audience(s) data determined from the online media monitoring data 130/135 to generate the ratings data 240. In some examples, the data fusion process 235 performs such data fusion by aligning the selected data entries from the secondary online data feeds 140, 150, 160 and/or 170 with the time varying audience(s) using the timestamps included in the online media monitoring data 130/135 and the time information included in the selected data entries from the secondary online data feeds 140, 150, 160 and/or 170. Then, the data fusion process 235 augments the time varying audience data for given media and a particular timestamp with information parsed from the selected data entries from the secondary online data feeds 140, 150, 160 and/or 170 corresponding to that particular timestamp.

Figure 20:
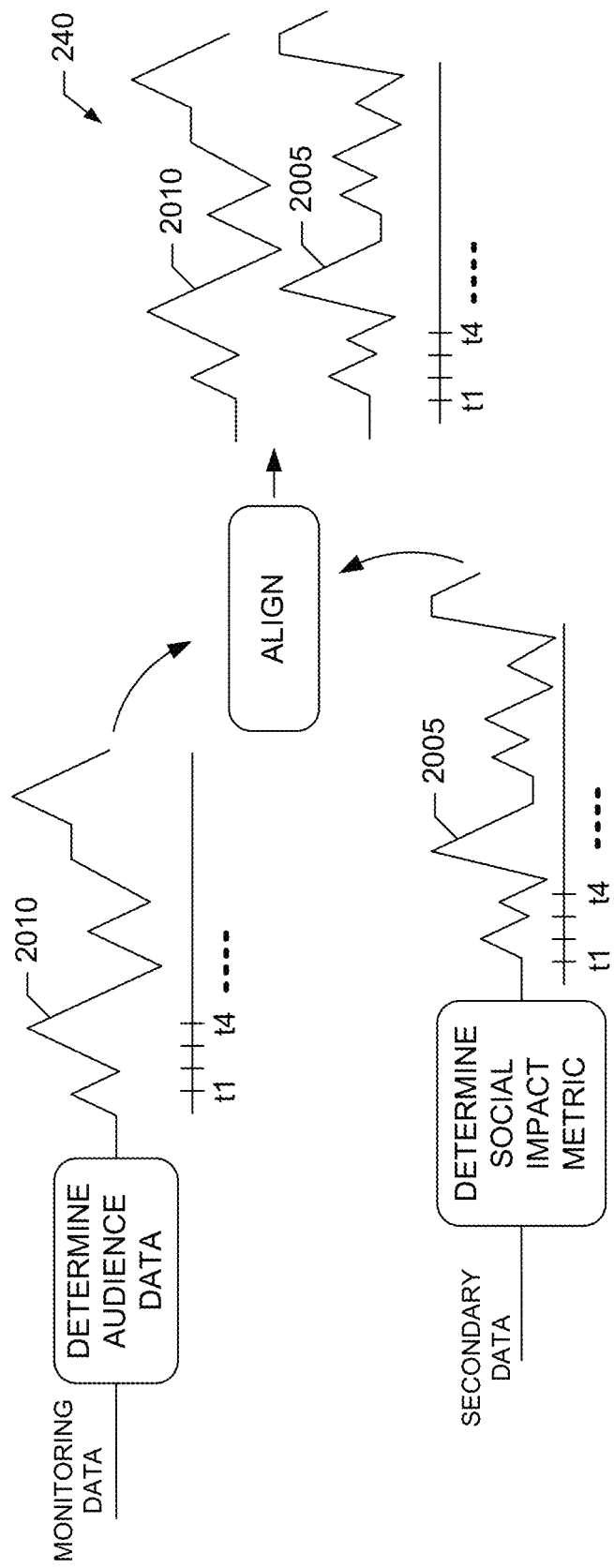
FIG. 20 depicts a first example operation of the example data fusion process of FIG. 2.

Additionally or alternatively, in some examples in which a social media data feed 140 is processed for fusing with the online media monitoring data 130/135, the data fusion process 235 performs an example procedure as illustrated in FIG. 20 to process the social media data entries selected from the social media data feed 140 (e.g., based on the monitoring data timestamps and/or media identifiers, as described above) to determine an example time varying social impact metric 2005 for media identified by a media identifier included in the media monitoring data 130/135. In such examples, the data fusion process 235 then fuses the time varying social impact metric 2005 for the media with time varying audience data 2010 determined for the media by aligning, based on the monitoring data timestamps, values of the time varying audience determined for the media from the media monitoring data 130/135 with corresponding values of the media's time varying social impact to determine the online media ratings 240.

In some examples, the data fusion process 235 determines the time varying social impact metric 2005 for given media as follows. For a particular media identifier included in the online media monitoring data 130/135, the data fusion process 235 of this example determines, for each timestamp included in the media monitoring data 130/135 for the particular media identifier, a respective number of distinct social media users associated with (e.g., who posted, submitted, authored, updated, etc.) a respective subset of the social media data entries corresponding to that respective timestamp and having content (e.g., as determined by the social media data parsing process 215) corresponding to the particular media identifier. This time-varying number of distinct social media users may then represent the time varying social impact metric 2005 determined by the data fusion process 235 for the media identified by the particular media identifier. For example, for a first media identifier included in the online media monitoring data 130/135 that identifies first media, the data fusion process 235 may determine that a first number of social media users were responsible for posting a first subset of social media data entries relevant to the first media and that occurred in a time window containing a first timestamp associated with the first media identifier. The data fusion process 235 may also determine that a second number of social media users were responsible for posting a second subset of social media data entries relevant to the first media and that occurred in a time window containing a second timestamp associated with the first media identifier. In such an example, the data fusion process 235 may determine that the time varying social impact metric 2005 for the first media identified by the first media identifier corresponds to the first number of social media users at a first time corresponding to the first timestamp, but then corresponds to the second number of social media users at a second time corresponding to the second timestamp.

Additionally or alternatively, in some examples, the data fusion process 235 may determine the time varying social impact metric 2005 based on metrics characterizing the reaches of the social media users included in the respective numbers of distinct social media users associated with the respective subsets of the social media data entries corresponding to different timestamps and media identifiers. In some examples, such metrics are based on a number of subscribers, a number of followers, a number of friends, etc., of each social media user. In some such examples, the data fusion process 235 further combines (e.g., adds, multiplies, averages, etc.) the metrics characterizing the respective reaches (e.g., in terms of totals and/or averages of the numbers of subscribers, the numbers of followers, the numbers of friends, etc.) of the social media users included in the respective numbers of distinct social media users corresponding to different timestamps to determine respective time varying values characterizing the social media reach of the media identified by the particular media identifier at times corresponding to the different timestamps. These time-varying values of the social media reach may additionally or alternatively be used to represent the time varying social impact metric 2005 determined by the data fusion process 235 for the media identified by the particular media identifier.

For example, consider the preceding example above in which the data fusion process 235 determined that a first number of social media users were responsible for posting a first subset of social media data entries relevant to the first media and that occurred in a time window containing a first timestamp associated with a first media identifier, and that a second number of social media users were responsible for posting a second subset of social media data entries relevant to the first media and that occurred in a time window containing a second timestamp associated with the first media identifier. In such an example, the data fusion process 235 may determine the time varying social impact metric 2005 associated with the first media identified by the first media identifier to correspond to a first social media reach value at a first time corresponding to the first timestamp, and a second social media reach value at a second time corresponding to the second timestamp. Furthermore, the data fusion process 235 may determine the first social media reach value to be a sum of the number of subscribers, the number of followers, the number of friends, etc., associated with each of the social media users included in the first number of social media users, whereas the data fusion process 235 may determine the second social media reach value to be a sum of the number of subscribers, the number of followers, the number of friends, etc., associated with each of the social media users included in the second number of social media users.

Additionally or alternatively, in some examples, the data fusion process 235 may determine the time varying social impact metric 2005 based on metrics characterizing the social media feedback associated with the respective subsets of the social media data entries corresponding to different timestamps and media identifiers. For example, for a particular media identifier included in the online media monitoring data 130/135, the data fusion process 235 may determine, for each timestamp included in the media monitoring data 130/135 for the particular media identifier, metrics characterizing the social media feedback for each one of a subset of the social media data entries from the social media data feed(s) 140 corresponding to that respective timestamp and media identifier. For example, such metrics can include, but are not limited to, a number of likes, a number of dislikes, a number of thumbs-up, a number of thumbs-down, etc., associated with each social media data entry. In some such examples, the data fusion process 235 further combines the metrics characterizing the social media feedback for the subsets of the social media data entries corresponding to the particular media identifier and its different timestamps to determine time-varying overall values characterizing the social media response (e.g., in terms or totals and/or averages of the numbers of likes, the numbers of dislikes, the numbers of thumbs-up, the numbers of thumbs-down, etc., and/or combination thereof, such as the number of likes minus the number of dislikes divided by the total number of likes and dislikes, the number of thumbs-up minus the number of thumb-down divided by the total number of thumbs-up and thumbs-down, etc.) to the media identified by the particular media identifier at different times corresponding to the different timestamps. These time-varying overall values of the social media feedback/response may additionally or alternatively be used to represent the time varying social impact metric 2005 determined by the data fusion process 235 for the media identified by the particular media identifier.

For example, consider the preceding example above in which the data fusion process 235 determined that a first subset of social media data entries relevant to the first media occurred in a time window containing a first timestamp associated with a first media identifier, and that a second subset of social media data entries relevant to the first media occurred in a time window containing a second timestamp associated with the first media identifier. In such an example, the data fusion process 235 may determine the time varying social impact metric 2005 associated with the first media identified by the first media identifier to correspond to a first social media feedback value at a first time corresponding to the first timestamp, and a second social media feedback value at a second time corresponding to the second timestamp. Furthermore, the data fusion process 235 may determine the first social media feedback value to be a value determined by combining (e.g., summing, averaging, etc.) the individual social media feedback values (e.g., determined based on the number of likes, the number of dislikes, the number of thumbs-up, the number of thumbs-down, etc.) associated with each of the social media data entries included in the first subset of social media data entries, whereas the data fusion process 235 may determine the second social media feedback value by combining the individual social media feedback values associated with each of the social media data entries included in the second subset of social media data entries.

Additionally or alternatively, in some examples, the data fusion process 235 may determine the time varying social impact metric 2005 based on other metrics characterizing the social media response associated with the respective subsets of the social media data entries corresponding to different timestamps and media identifiers. For example, for a particular media identifier included in the online media monitoring data 130/135, the data fusion process 235 determines, for each timestamp included in the media monitoring data 130/135 for the particular media identifier, a subset of the social media data entries from the social media data feed(s) 140 corresponding to that respective timestamp and media identifier. In some such examples, the data fusion process 235 further processes the contents of respective ones of the subset of the social media data entries corresponding to a particular media identifier and a particular timestamp to determine a social media response to the media identified by the particular media identifier and at a time corresponding to the particular timestamp. For example, such processing may involve processing the contents of the social media data entries to detect positive and/or negative keywords and/or phrases, positive and/or negative emoticons, etc. In some such examples, the data fusion process 235 further combines (e.g., adds, multiplies, averages, etc.) the processed contents of the subsets of the social media data entries corresponding to the particular media identifier and its different timestamps to determine time-varying overall values characterizing the social media response (e.g., a total number of positive entries, a percent of positive entries, a total number of negative entries, a percent of negative entries, etc.) of the media identified by the particular media identifier at different times corresponding to the different timestamps. The time-varying values of the social media response may additionally or alternatively be used to represent the time varying social impact metric 2005 determined by the data fusion process 235 for the media identified by the particular media identifier.

Figure 21:
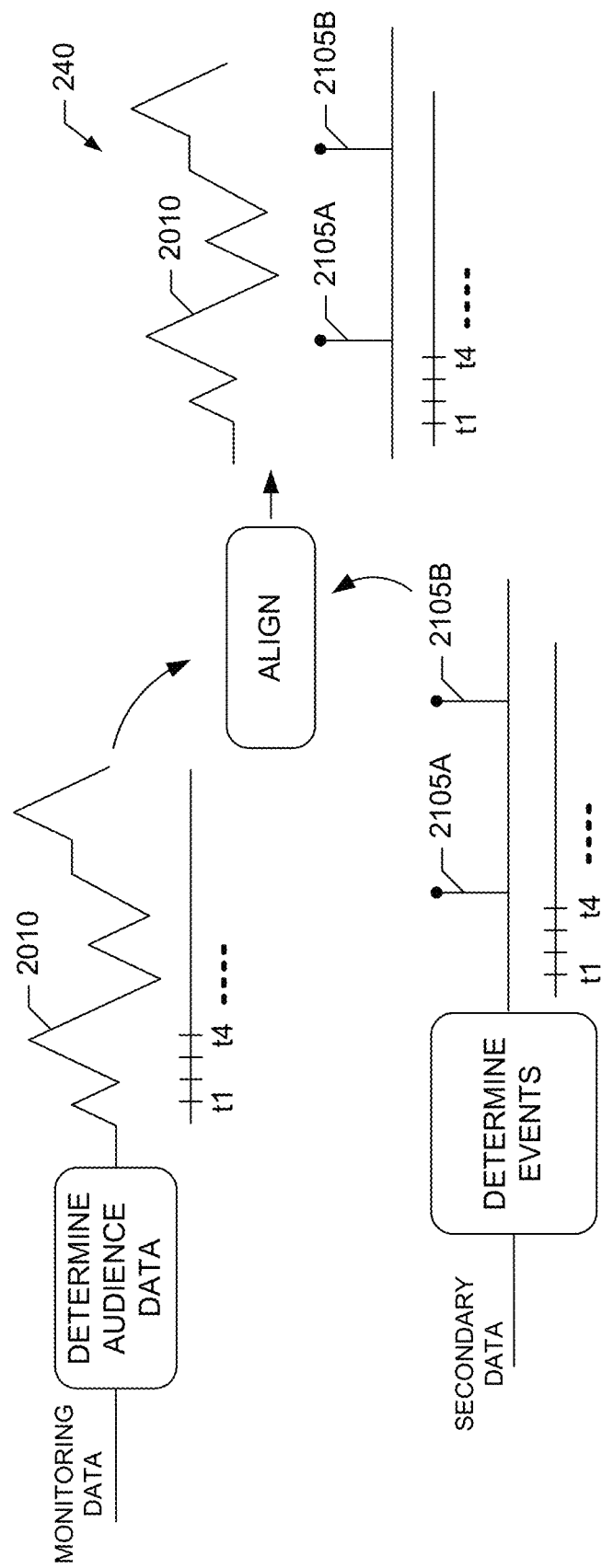
FIG. 21 depicts a second example operation of the example data fusion process of FIG. 2.

Additionally or alternatively, in some examples in which one or more of a news data feed 150, a weather data feed 160 and/or a program guide data feed 170 are processed for fusing with the online media monitoring data 130/135, the data fusion process 235 performs an example procedure as illustrated in FIG. 21 to process the news data feed 150, the weather data feed 160 and/or the program guide data feed 170 (e.g., based on the monitoring data timestamps and/or media identifiers, as described above) to select news feed data entries, weather feed data entries and/or program guide data entries, etc., corresponding to news-related events, network-related events, or program-related events 2105A-B, if any, occurring each timestamp (or a group of timestamps) associated with a particular media identifier in the media monitoring data 130/135. In such examples, the data fusion process 235 then fuses the events 2105A-B with the time varying audience data 2010 determined for the media to generate the online media ratings 240 by aligning, based on the monitoring data timestamps, values of the time varying audience determined for the particular media from the media monitoring data 130/135 with information (e.g., taken from the contents of the relevant news feed data entries, weather feed data entries and/or program guide data entries, etc.) describing the events 2105A-B, if any, occurring at each different timestamp associated with a particular media identifier. In this way, events described in the news feed data entries, weather feed data entries and/or program guide data entries, etc., at different times can be correlated, in time, against the values of the time varying audience determined for the media from the media monitoring data 130/135 to determine what effect, if any, a particular event 2105A-B has/had on the audience of particular media identified by a particular media identifier.

For example, in the example online media ratings 240 of FIG. 21, the event 2105A is associated with an increase in the audience 2010 associated with the online media being monitored, whereas the event 2105B appears to have little to no effect on the audience 2010. If the media corresponds to weather programs being streamed from a server associated with a weather media provider, such as The Weather Channel, event 2105A might correspond to a weather alert issued by The Weather Channel. The example online media ratings 240 of FIG. 21 indicate that the weather alert 2105A has the desired effect of increasing interest in the media being streamed by The Weather Channel. Conversely, event 2105B might correspond to a news alert issued by a news provider, such as CNN. The example online media ratings 240 of FIG. 21 indicate that the news alert 2105B has causes little to no change in the audience accessing the media being streamed by The Weather Channel.

Figure 3:
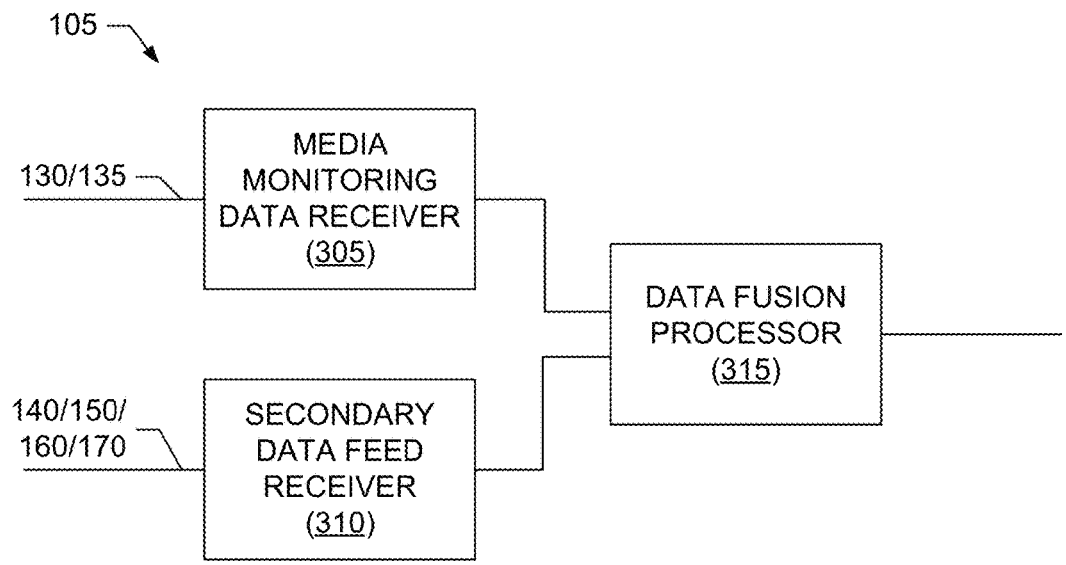
FIG. 3 is a block diagram depicting an example implementation of the audience measurement entity server included in the example environment of use of FIG. 1.

A block diagram depicting an example implementation of the AME server 105 of FIG. 1 is illustrated in FIG. 3. The example AME server 105 of FIG. 3 includes an example media monitoring data receiver 305 to receive the online media monitoring data 130/135 from, for example, servers, such as the streaming media server 120, and/or meters, such as the meter 125, etc., and/or any combination(s) thereof. The example AME server 105 of FIG. 3 includes an example secondary data feed receiver 310 to receive secondary data feed(s), such as one or more of the social media data feed(s) 140, the news data feed(s) 150, the weather data feed(s) 160, the program guide data feed(s) 170 from, for example, one or more servers, such as the social media server(s) 145, the news server(s) 155, the weather server(s) 165, the program guide server(s) 175, etc. The media monitoring data receiver 305 and the secondary data feed receiver 310 can be implemented by any appropriate type(s) and/or number(s) of network and/or data interface(s), such as the example interface circuit 1620 of FIG. 16.

The example AME server 105 of FIG. 3 further includes an example data fusion processor 315 to fuse the online media monitoring data 130/135 received by the media monitoring data receiver 305 with the secondary data feeds 140/150/160/170 received by the secondary data feed receiver 310 to generate ratings data characterizing exposure to online media. For example, the data fusion processor 315 may implement the example procedure 200 described above in connection with FIG. 2.

Figure 4:
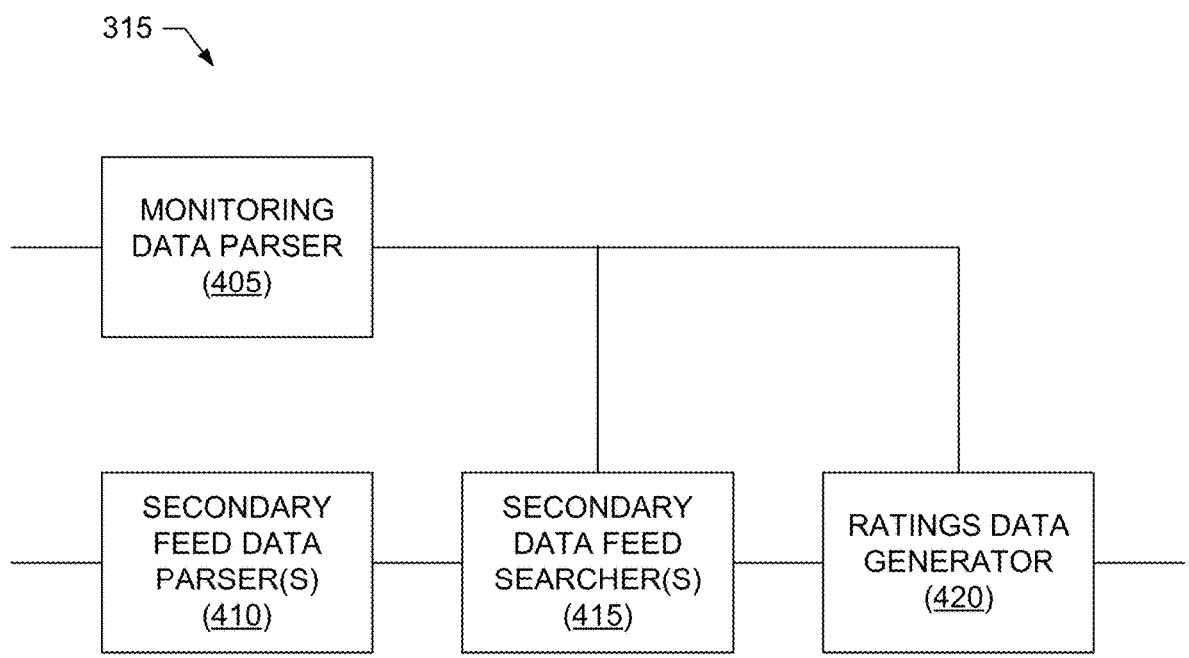
FIG. 4 is a block diagram depicting an example implementation of a data fusion processor that may be included in the example audience measurement entity server of FIG. 3.

A block diagram depicting an example implementation of the data fusion processor 315 of FIG. 3 is illustrated in FIG. 4. The example data fusion processor 315 of FIG. 4 includes an example monitoring data parser 405 to determine the media identifiers and associated timestamps included in the online media monitoring data 130/135. For example, the monitoring data parser 405 may parse the received online media monitoring data 130/135 to access instances of a particular media identifier identifying particular online media, and the timestamps associated with that particular media identifier, to track presentation of the particular online media by the monitored consumer media device 110. In some examples, the monitoring data parser 405 may implement the example media monitoring data parsing process 205 of FIG. 2.

The example data fusion processor 315 of FIG. 4 also includes one or more example secondary feed data parsers 410 to parse the secondary data feed(s) 140/150/160/170 received by the secondary data feed receiver 310 to determine the contents of the data entries included in the secondary data feed(s) 140/150/160/170. For example, respective secondary data feed parser(s) 410 may implement one or more of the example social media data parsing process 215, the example news data parsing process 220, the example weather data parsing process 225, and/or the example program guide data parsing process 230 of FIG. 2. For example, the secondary feed data parser(s) 410 can be configured with the formats in which data is arranged in the data entries of the secondary data feed(s) 140/150/160/170. In such examples, the secondary feed data parser(s) 410 uses the format for the data entries of a particular one of the secondary data feed(s) 140/150/160/170 to parse (e.g., extract) different pieces of information from a data entry, such as a time (e.g., timestamp) for the data entry, the contents (e.g., typed text, embedded hyperlinks, etc.) of the data entry, an author of the entry, etc., for storage in a searchable database and/or other storage. These different pieces of parsed information can then be searched to, for example, determine whether the time for data entry corresponds to a timestamp in the online media monitoring data 130/135, whether the contents of the data entry include information matching a media identifier in the online media monitoring data 130/135, etc.

Figure 5:
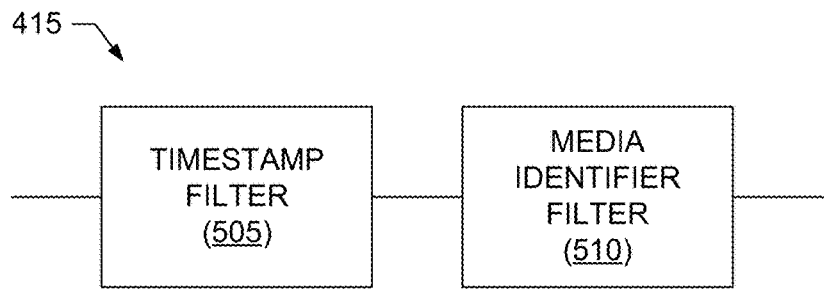
FIG. 5 is a block diagram depicting an example implementation of a secondary data feed searcher that may be included in the example data fusion processor of FIG. 4.
Figure 6:
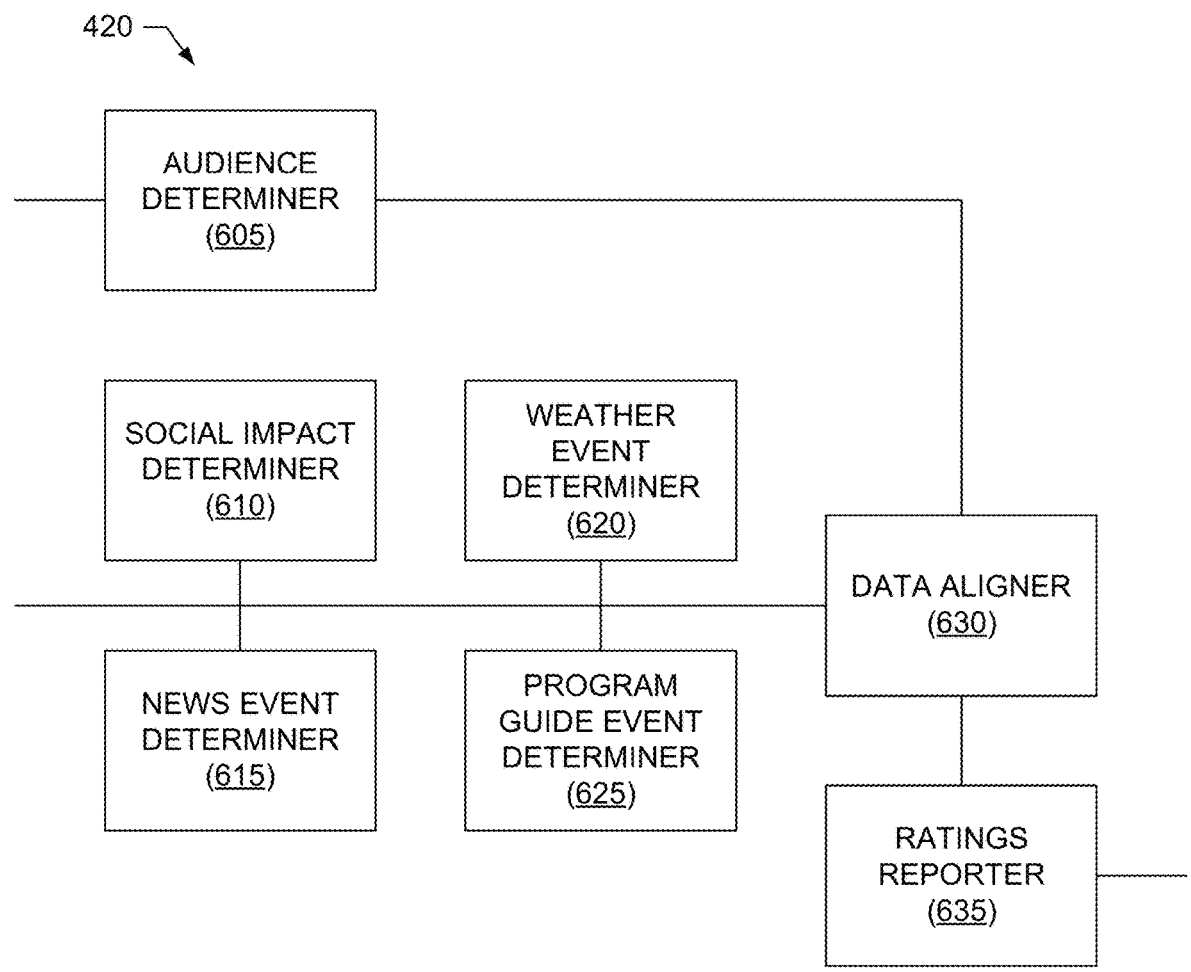
FIG. 6 is a block diagram depicting an example implementation of a ratings data generator that may be included in the example data fusion processor of FIG. 4.

The example data fusion processor 315 of FIG. 4 further includes one or more example secondary feed data searchers 415 to search the secondary data feed entries parsed by the secondary feed data parser(s) 410 to identify respective subsets of the secondary data feed entries to be fused with respective portions of the media monitoring data corresponding to different media identifiers and associated timestamps. An example implementation of one of the secondary feed data parser 410 is illustrated in FIG. 5 and discussed in further detail below. The example data fusion processor 315 of FIG. 4 also includes an example ratings data generator 420 to generate ratings data characterizing online media exposure by combining, augmenting, and/or otherwise fusing the online media monitoring data (e.g., parsed by the monitoring data parser 405) with the appropriate secondary data feed entries (e.g., parsed and selected by the secondary feed data parser(s) 410 and the secondary feed data searcher(s) 415) based on the timestamps included in the media monitoring data. An example implementation of one of the ratings data generator 420 is illustrated in FIG. 6 and discussed in further detail below. In some examples, the secondary feed data searcher(s) 415 and the ratings data generator 420 collectively implement the example data fusion process 235 of FIG. 2.

A block diagram depicting an example implementation of the example secondary feed data parser 410 from FIG. 4 is illustrated in FIG. 5. The example secondary feed data parser 410 of FIG. 4 includes an example timestamp filter 505 to select a first group of parsed data entries from the one or more of secondary online data feeds 140/150/160/170 having entry times (e.g., timestamps) corresponding to (e.g., equal to or within one or more time window(s) of, etc.) the timestamps included in the media monitoring data entries for a particular media identifier. In this way, the timestamp filter 505 identifies a group of parsed secondary data feed entries that at least correspond in time to the respective timestamps at which media identified by the particular media identifier was accessed, presented, etc., by a computing platform (e.g., the consumer media device 110).

The example secondary feed data parser 410 of FIG. 4 includes an example media identifier filter 510 to further select a second group of data entries from the previously selected first group of secondary data feed entries based on a particular media identifier being examined. For example, the media identifier filter 510 may select those entries in the first group of secondary data feed entries having content corresponding to the particular media identifier (e.g., matching some or all of the information conveyed by the particular media identifier, such as a name of the media, a source of the media, a character in the media, an actor/actress in the media, etc.) to be the second group of data entries. In some examples, the media identifier filter 510 is used to process secondary data feeds that may mention the media corresponding to the particular media identifier (e.g., such as the social media data feed(s) 140, the news feed(s) 150, the program guide data feed(s) 170, etc.), but is not used to process secondary data feeds that are unlikely to mention the media corresponding to the particular media identifier (e.g., such as the weather feed(s) 160, etc.)

A block diagram depicting an example implementation of the ratings data generator 420 of FIG. 4 is illustrated in FIG. 6. The example ratings data generator 420 of FIG. 6 includes an example audience determiner 605 to process the media identifiers and timestamps included in the online media monitoring data 130/135 to determine the time varying audience(s) of particular media identified by the media identifiers at the times represented by the timestamps. For example, and as described above, the audience determiner 605 may examine the parsed data entries of the online media monitoring data 130/135 corresponding to a particular media identifier and use the timestamps and consumer media device identifiers included in those records to determine a time varying count of the number of the consumer media devices (e.g., representing the audience) that accessed and/or presented, the particular media identified by the particular media identifier over a given period of time.

The example ratings data generator 420 of FIG. 6 also includes an example social impact determiner 610 to process the parsed and filtered data entries from the social media data feed(s) 140 to determine metric(s) representing the time varying social impact of media identified by one or more media identifiers included in the media monitoring data 130/135, as described above. For example, and as described above, the social impact determiner 610 may determine a time varying social impact metric for particular media identified by a particular media identifier to correspond to one or more of (i) the respective numbers of distinct social media users associated with the respective subsets of the social media data entries corresponding to respective timestamps associated with the particular media identifier, (ii) the time varying values characterizing the social media reach of the media identified by the particular media identifier at times corresponding to the different timestamps associated with the particular media identifier, (iii) the time varying values characterizing the social media feedback and/or response to the media identified by the particular media identifier at times corresponding to the different timestamps associated with the particular media identifier, etc.

In some examples, the ratings data generator 420 of FIG. 6 further includes an example news event determiner 615 to select data entries parsed from the news feed(s) 150 and corresponding to (e.g., at the same time or within time windows of) the timestamps or groups of timestamps associated with the respective media identifiers in the media monitoring data 130/135. In some examples, the news event determiner 615 also examines the selected news feed data entries for keywords/phrases (e.g., such as the words "alert," "bulletin," etc., and/or text corresponding to (e.g., matching) information included in a media identifier, such as a program name, etc.) to further select the news feed data entries having a higher likelihood of affecting online media exposure. Additionally or alternatively, in some examples, the ratings data generator 420 of FIG. 6 also includes an example weather event determiner 620 to select data entries parsed from the weather feed(s) 160 and corresponding to (e.g., at the same time or within time windows of) the timestamps or groups of timestamps associated with the respective media identifiers in the media monitoring data 130/135. In some examples, the weather event determiner 620 also examines the selected weather feed data entries for keywords/phrases (e.g., such as the words "alert," "watch," "warning," etc., and/or text corresponding to a media identifier, such as a program name, etc.) to further select the weather feed data entries having a higher likelihood of affecting online media exposure. Additionally or alternatively, in some examples, the ratings data generator 420 of FIG. 6 includes an example program guide event determiner 625 to select data entries parsed from the program guide feed(s) 170 and corresponding to (e.g., at the same time or within time windows of) the timestamps or groups of timestamps associated with the respective media identifiers in the media monitoring data 130/135. In some examples, the program guide event determiner 620 also examines the selected program guide data entries for keywords/phrases (e.g., such as text corresponding to a media identifier, such as a program name, etc.) to further select the program guide data entries having a higher likelihood of affecting online media exposure.

In the illustrated example of FIG. 6, the ratings data generator 420 includes an example data aligner 630 to generate online media exposure ratings data by aligning, in time, the time varying audience data determined by the audience determiner 605 for different media with one or more of (i) the time varying social impact data determined by the social impact determiner 610, (ii) the news feed data entries determined by the news event determiner 615, (iii) the weather feed data entries determined by the weather event determiner 620, (iv) the program guide data feed entries determined by the program guide event determiner 625, etc., as described above. For example, such alignment can be performed by comparing the timestamps included in the media monitoring data 130/135 with time information included in the secondary data feeds. The example ratings data generator 420 of FIG. 6 further includes an example ratings reporter 635 to report the ratings data output from the data aligner 630. The ratings reporter 635 can be implemented by any appropriate type(s) and/or number(s) of network and/or data interface(s), such as the example interface circuit 1620 of FIG. 16. Additionally or alternatively, the ratings reporter 635 can be implemented by, for example, a graphical user interface (GUI) capable of presenting time varying audience data aligned with one or more of time varying social impact data, time varying news event data, time varying weather event data, and/or time varying program guide event data, etc., in real-time and/or non-real-time.

Figure 7:
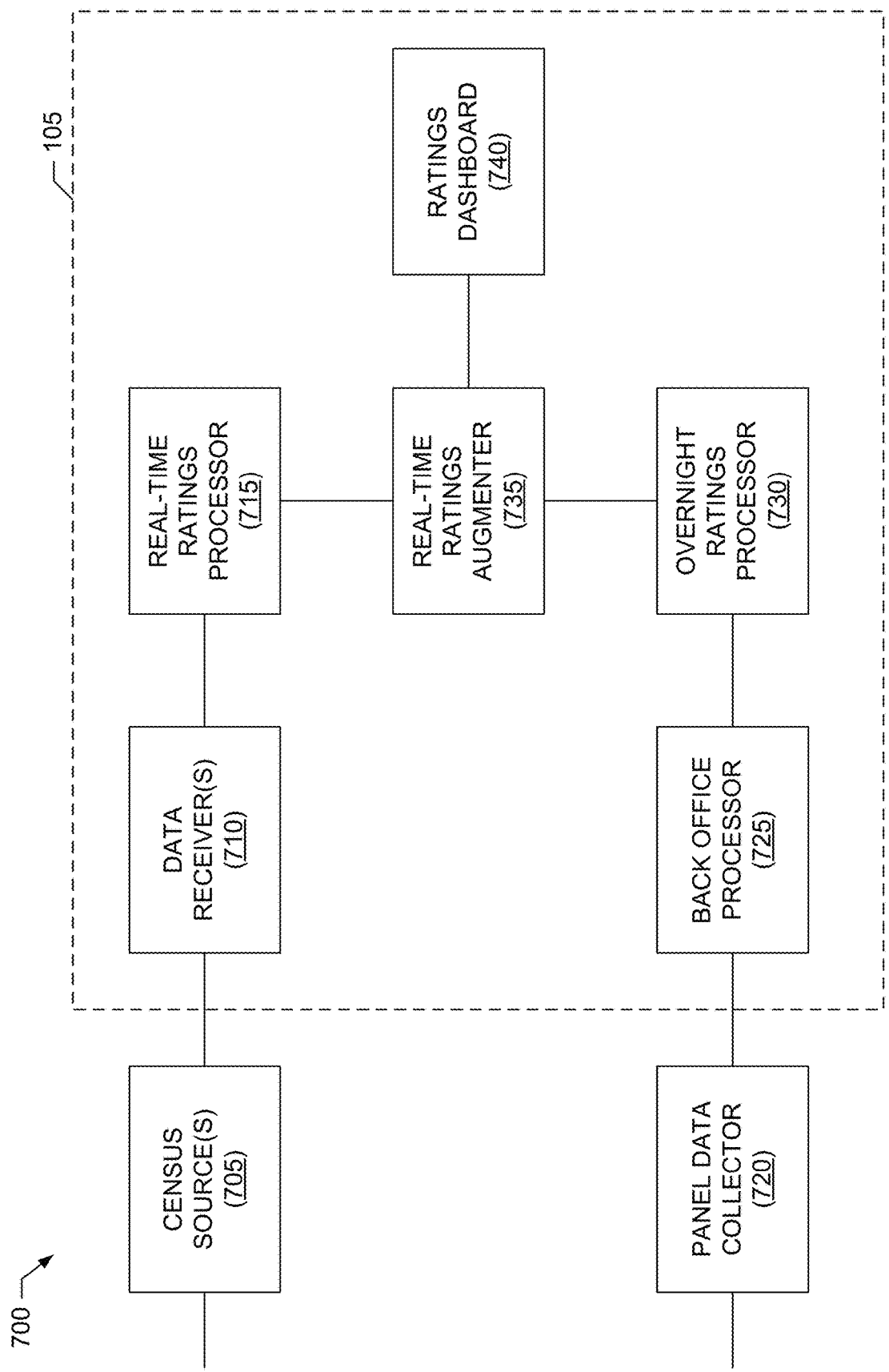
FIG. 7 is a block diagram of an example environment of use including a second example implementation of the audience measurement entity server of FIG. 1 that is able to augment ratings data, which characterizes online media exposure, with overnight ratings data.

A block diagram depicting a second example implementation of the AME server 105 included in a second example environment of use 700 is illustrated in FIG. 7. In the illustrated example of FIG. 7, the AME server 105 is configured to augment online media ratings data (e.g., which may be updateable in real-time) with overnight ratings data determined, for example, by monitoring audience exposure to broadcast media (e.g., broadcast television, broadcast radio, etc.) For example, the AME server 105 of FIG. 7 may augment online media ratings data, which includes real-time, time-varying audience data for online media, as well as possibly other time-varying metrics obtained from one or more secondary data feed(s), with demographics data included in the overnight ratings data determined for the broadcast media.

Beginning with online media monitoring, the example environment of use 700 of FIG. 7 includes one or more example census sources 705 that provide (e.g., in real-time) online media monitoring data, such as the media monitoring data 130/135 described above, and which includes media identifiers and timestamps logging the online media accessed and/or presented by computing platforms in communication with, monitored by, etc., the census source(s) 705. For example, the census source(s) 705 can correspond to one or more server, such as the server 120, one or more meter, such as the meter 125, etc., and/or any combination thereof. In some examples, the census source(s) 705 also provide (e.g., in real-time) one or more secondary online data feeds having information to be combined with the online media monitoring data to generate ratings data characterizing online media exposure. For example, the census source(s) 705 can correspond to one or more social media servers 145 providing the social media data feed(s) 140, one or more news servers 155 providing the news data feed(s) 150, one or more weather servers 165 providing the weather data feed(s) 160, one or more program guide servers 175 providing the program guide data feed(s) 170, etc.

In the illustrated example of FIG. 7, the AME server 105 includes one or more example data receivers 710 to receive the data provided by the census source(s) 705. For example, the data receiver(s) 710 can include the media monitoring data receiver 305 to receive online media monitoring data provided by the census source(s) 705. Additionally or alternatively, the data receiver(s) 710 can include the secondary data feed receiver 310 to receive the secondary online data feed(s) provided by the census source(s) 705. As such, the data receiver(s) 710 can be implemented by any appropriate type(s) and/or number(s) of network and/or data interface(s), such as the example interface circuit 1620 of FIG. 16.

The example AME server 105 also includes an example real-time ratings processor 715 to process the online media monitoring data and any secondary data feed information received from the census source(s) 705 to generate real-time ratings data characterizing online media exposure. For example, the real-time ratings processor 715 can include the example data fusion processor 315 to fuse, as described above, the online media monitoring data and secondary data feed information to generate real-time ratings data that is updated as, or shortly after, the data is received from the census source(s) 705.

Turning next to broadcast media monitoring, the example environment of use 700 further includes an example panel data collector 720 to collect audience measurement data determined by one or more audience measurement system monitoring media exposure associated with a statistically selected group of panelists. For example, the panel data collected by the panel data collector 720 can be obtained using one or more audience measurement technique(s) employing watermarks and/or signatures to identify media accessed by and/or presented to the panelists. In the context of media monitoring, watermarks may be transmitted within and/or with media signals. For example, watermarks can be metadata (e.g., such as identification codes, ancillary codes, etc.) transmitted with media (e.g., inserted into the audio, video, or metadata stream of media) to uniquely identify broadcasters and/or media (e.g., content or advertisements), and/or to convey other information. Watermarks are typically extracted using a decoding operation.

In contrast, signatures are a representation of a characteristic of the media signal (e.g., a characteristic of the frequency spectrum of the signal). Signatures can be thought of as fingerprints. Signatures are typically not dependent upon insertion of identification codes (e.g., watermarks) in the media, but instead preferably reflect an inherent characteristic of the media and/or the signal transporting the media. Systems to utilize codes (e.g., watermarks) and/or signatures for media monitoring are long known. See, for example, Thomas, U.S. Pat. No. 5,481,294, which is hereby incorporated by reference in its entirety.

The example AME server 105 of FIG. 7 includes an example back office processor 725 to receive the panel data from the panel data collector 720. For example, the back office processor 725 can be implemented by any appropriate type(s) and/or number(s) of network and/or data interface(s), such as the example interface circuit 1620 of FIG. 16. The example AME server 105 of FIG. 7 also includes an example overnight ratings processor 730 to process the received panel data to determine overnight ratings data characterizing media exposure associated with the panelists. Such overnight ratings data can include, but is not limited to, television ratings data, radio ratings data, movie ratings data, etc., and can be generated using any appropriate ratings generation technique.

In many panelist-based audience measurement systems, the overnight ratings data generated by the overnight ratings processor 730 includes demographics data along with other data characterizing the media accessed by and/or presented to the panelists. For example, such demographic data may include, but is not limited to, gender, age, race, income, location, etc., of the panelists exposed to the media identified in the audience measurement data. Such demographic data can be determined by the overnight ratings processor 730 because the panelists are known to the AME and have agreed to provide such information for the purpose of generating ratings data.

In some examples, the AME server 105 of FIG. 7 includes an example real-time ratings augmenter 735 to augment the real-time ratings data determined by the example real-time ratings processor 715 with information included in the overnight ratings data determined by the example overnight ratings processor 730. For example, the real-time ratings augmenter 735 can augment the real-time ratings data determined for particular online media with the demographic data included in the overnight ratings data and associated with panelists exposed to the same or similar media. Additionally or alternatively, the real-time ratings augmenter 735 can adjust (e.g., increase, decrease, etc.) values of the time-varying audience(s) specified in the real-time ratings for particular online media based on the audience values included in the overnight ratings data for the same or similar media. In some examples, media is considered to be the same if the media depicts the same content (e.g., television program, radio program, movie, etc.), advertisement(s) (e.g., commercial(s), etc.), etc., whereas media is considered similar if, for example, the different media are provided by the same source, the different media belong to the same franchise (e.g., the same television series, the same movie franchise, etc.), the different media correspond to the same genre, the different media include the same talent (e.g., actors, actresses, etc.), etc.

In some examples, the AME server 105 of FIG. 7 further includes an example ratings dashboard 740 to present the augmented, real-time ratings data determined by the real-time ratings augmenter 735. In some such examples, the ratings dashboard 740 includes a graphical user interface (GUI) and/or other user interface to present the real-time ratings data (before and/or after augmentation) as one or more time series plots using the timestamps from the online media monitoring data as the timebase, and with the plots depicting the time-varying audiences, the time-varying social impact, the time-varying news/weather events, time-varying demographics, etc., that are correlated with the online media monitoring data in time and updated as new data becomes available. Additionally or alternatively, the ratings dashboard 740 may output the real-time ratings data (before and/or after augmentation) in any data format and at any reporting interval (e.g., which may be time-based and/or event-based) to permit further post-processing of the ratings data.

Figure 22:
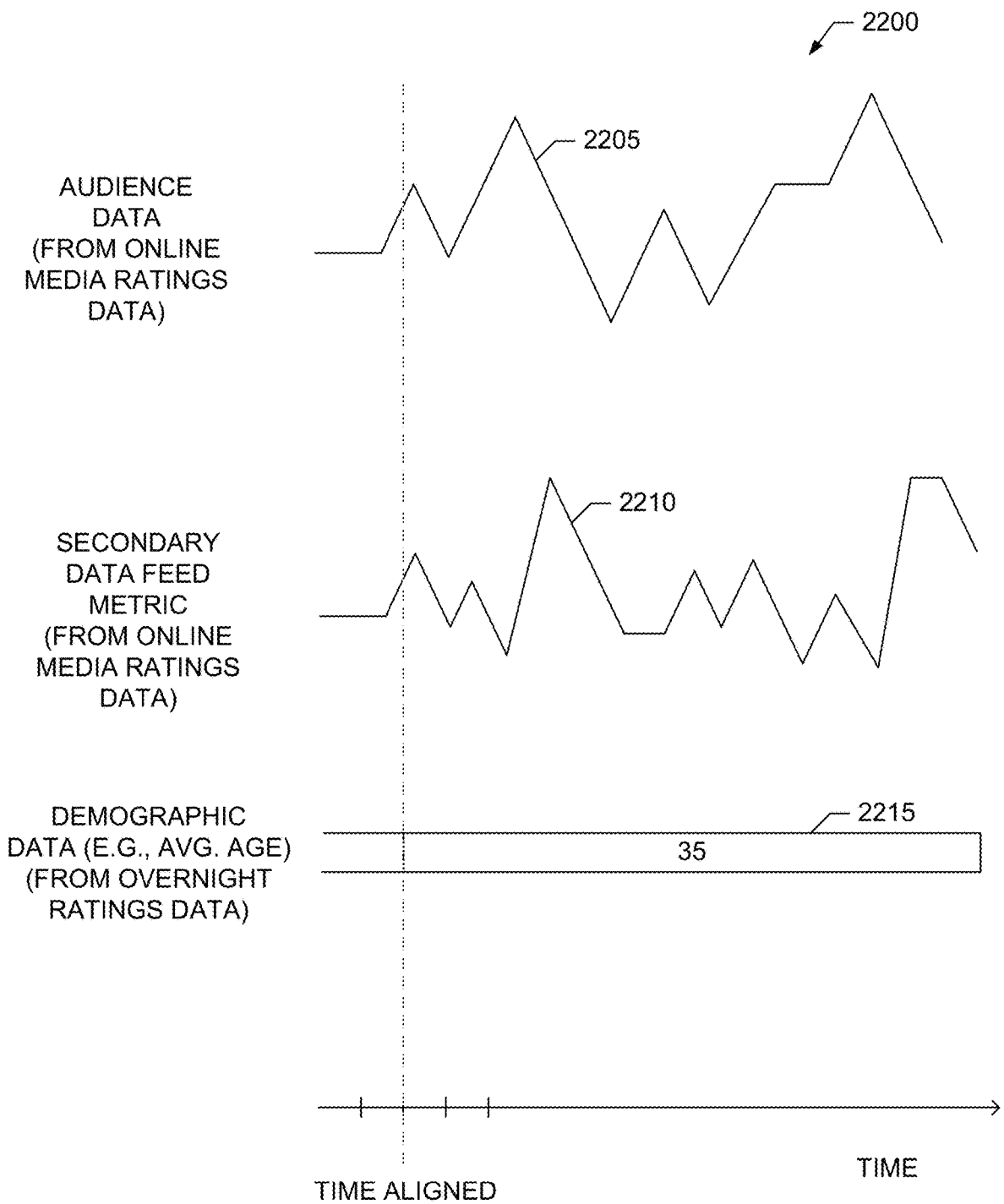
FIG. 22 depicts an example output of an example ratings dashboard included in the example operation of the example audience measurement entity server of FIG. 7.

Example plots 2200 that may be output by the ratings dashboard 740 are illustrated in FIG. 22. In the example of FIG. 22, the ratings dashboard 740 provides a first example plot 2205 depicting the time-varying audience of particular online media, such as the time-varying audience data 2010 of FIG. 20, which may be determined by the real-time ratings processor 715, as described above. In the example of FIG. 22, the ratings dashboard 740 provides a second example plot 2210, which is time-aligned with the first example plot 2205, depicting the time-varying metric, such as the time-varying social metric 2005 of FIG. 20, associated with the particular online media, which may be determined by the real-time ratings processor 715 from one or more of the secondary data feeds 140/150/160/170 of particular online media, as described above. In the example of FIG. 22, the ratings dashboard 740 provides a third example plot 2215, which is time-aligned with the first example plot 2205 and the second example plot 2210, depicting demographics data included in the overnight ratings data for broadcast media that is the same as or similar to the particular online media, and which may be determined by the overnight ratings processor 730.

While example manners of implementing the example AME server 105 and the example meter 125 of FIG. 1 are illustrated in FIGS. 1-7, one or more of the elements, processes and/or devices illustrated in FIGS. 1-7 may be combined, divided, re-arranged, omitted, eliminated and/or implemented in any other way. Further, the example media monitoring data receiver 305, the example secondary data feed receiver 310, the example data fusion processor 315, the example monitoring data parser 405, the example secondary feed data parser(s) 410, the example secondary feed data searcher(s) 415, the example ratings data generator 420, the example timestamp filter 505, the example media identifier filter 510, the example audience determiner 605, the example social impact determiner 610, the example news event determiner 615, the example weather event determiner 620, the example program guide event determiner 625, the example data aligner 630, the example ratings reporter 635, the example data receiver(s) 710, the example real-time ratings processor 715, the example back office processor 725, the example overnight ratings processor 730, the example real-time ratings augmenter 735, the example ratings dashboard 740 and/or, more generally, the example AME server 105 and/or the example meter 125 of FIGS. 1-7 may be implemented by hardware, software, firmware and/or any combination of hardware, software and/or firmware. Thus, for example, any of the example media monitoring data receiver 305, the example secondary data feed receiver 310, the example data fusion processor 315, the example monitoring data parser 405, the example secondary feed data parser(s) 410, the example secondary feed data searcher(s) 415, the example ratings data generator 420, the example timestamp filter 505, the example media identifier filter 510, the example audience determiner 605, the example social impact determiner 610, the example news event determiner 615, the example weather event determiner 620, the example program guide event determiner 625, the example data aligner 630, the example ratings reporter 635, the example data receiver(s) 710, the example real-time ratings processor 715, the example back office processor 725, the example overnight ratings processor 730, the example real-time ratings augmenter 735, the example ratings dashboard 740 and/or, more generally, the example AME server 105 and/or the example meter 125 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example AME server 105, the example meter 125, the example media monitoring data receiver 305, the example secondary data feed receiver 310, the example data fusion processor 315, the example monitoring data parser 405, the example secondary feed data parser(s) 410, the example secondary feed data searcher(s) 415, the example ratings data generator 420, the example timestamp filter 505, the example media identifier filter 510, the example audience determiner 605, the example social impact determiner 610, the example news event determiner 615, the example weather event determiner 620, the example program guide event determiner 625, the example data aligner 630, the example ratings reporter 635, the example data receiver(s) 710, the example real-time ratings processor 715, the example back office processor 725, the example overnight ratings processor 730, the example real-time ratings augmenter 735 and/or the example ratings dashboard 740 is/are hereby expressly defined to include a tangible computer readable storage device or storage disk such as a memory, a digital versatile disk (DVD), a compact disk (CD), a Blu-ray disk, etc. storing the software and/or firmware. Further still, the example AME server 105, the example meter 125, the example media monitoring data receiver 305, the example secondary data feed receiver 310, the example data fusion processor 315, the example monitoring data parser 405, the example secondary feed data parser(s) 410, the example secondary feed data searcher(s) 415, the example ratings data generator 420, the example timestamp filter 505, the example media identifier filter 510, the example audience determiner 605, the example social impact determiner 610, the example news event determiner 615, the example weather event determiner 620, the example program guide event determiner 625, the example data aligner 630, the example ratings reporter 635, the example data receiver(s) 710, the example real-time ratings processor 715, the example back office processor 725, the example overnight ratings processor 730, the example real-time ratings augmenter 735 and/or the example ratings dashboard 740 may include one or more elements, processes and/or devices in addition to, or instead of, those illustrated in FIGS. 1-7, and/or may include more than one of any or all of the illustrated elements, processes and devices.

Flowcharts representative of example machine readable instructions for implementing the example AME server 105, the example meter 125, the example media monitoring data receiver 305, the example secondary data feed receiver 310, the example data fusion processor 315, the example monitoring data parser 405, the example secondary feed data parser(s) 410, the example secondary feed data searcher(s) 415, the example ratings data generator 420, the example timestamp filter 505, the example media identifier filter 510, the example audience determiner 605, the example social impact determiner 610, the example news event determiner 615, the example weather event determiner 620, the example program guide event determiner 625, the example data aligner 630, the example ratings reporter 635, the example data receiver(s) 710, the example real-time ratings processor 715, the example back office processor 725, the example overnight ratings processor 730, the example real-time ratings augmenter 735 and/or the example ratings dashboard 740 are shown in FIGS. 8-15. In these examples, the machine readable instructions comprise one or more programs for execution by a processor, such as the processor 1612 shown in the example processor platform 1600 discussed below in connection with FIG. 16. The one or more programs, or portion(s) thereof, may be embodied in software stored on a tangible computer readable storage medium such as a CD-ROM, a floppy disk, a hard drive, a digital versatile disk (DVD), a Blu-ray Disk™, or a memory associated with the processor 1612, but the entire program or programs and/or portions thereof could alternatively be executed by a device other than the processor 1612 and/or embodied in firmware or dedicated hardware (e.g., implemented by an ASIC, a PLD, an FPLD, discrete logic, etc.). Also, one or more of the machine readable instructions represented by the flowcharts of FIGS. 8-15 may be implemented manually. Further, although the example program(s) is(are) described with reference to the flowcharts illustrated in FIGS. 8-15, many other methods of implementing the example AME server 105, the example meter 125, the example media monitoring data receiver 305, the example secondary data feed receiver 310, the example data fusion processor 315, the example monitoring data parser 405, the example secondary feed data parser(s) 410, the example secondary feed data searcher(s) 415, the example ratings data generator 420, the example timestamp filter 505, the example media identifier filter 510, the example audience determiner 605, the example social impact determiner 610, the example news event determiner 615, the example weather event determiner 620, the example program guide event determiner 625, the example data aligner 630, the example ratings reporter 635, the example data receiver(s) 710, the example real-time ratings processor 715, the example back office processor 725, the example overnight ratings processor 730, the example real-time ratings augmenter 735 and/or the example ratings dashboard 740 may alternatively be used. For example, with reference to the flowcharts illustrated in FIGS. 8-15, the order of execution of the blocks may be changed, and/or some of the blocks described may be changed, eliminated, combined and/or subdivided into multiple blocks.

As mentioned above, the example processes of FIGS. 8-15 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 8-15 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Also, as used herein, the terms "computer readable" and "machine readable" are considered equivalent unless indicated otherwise.

Figure 8:
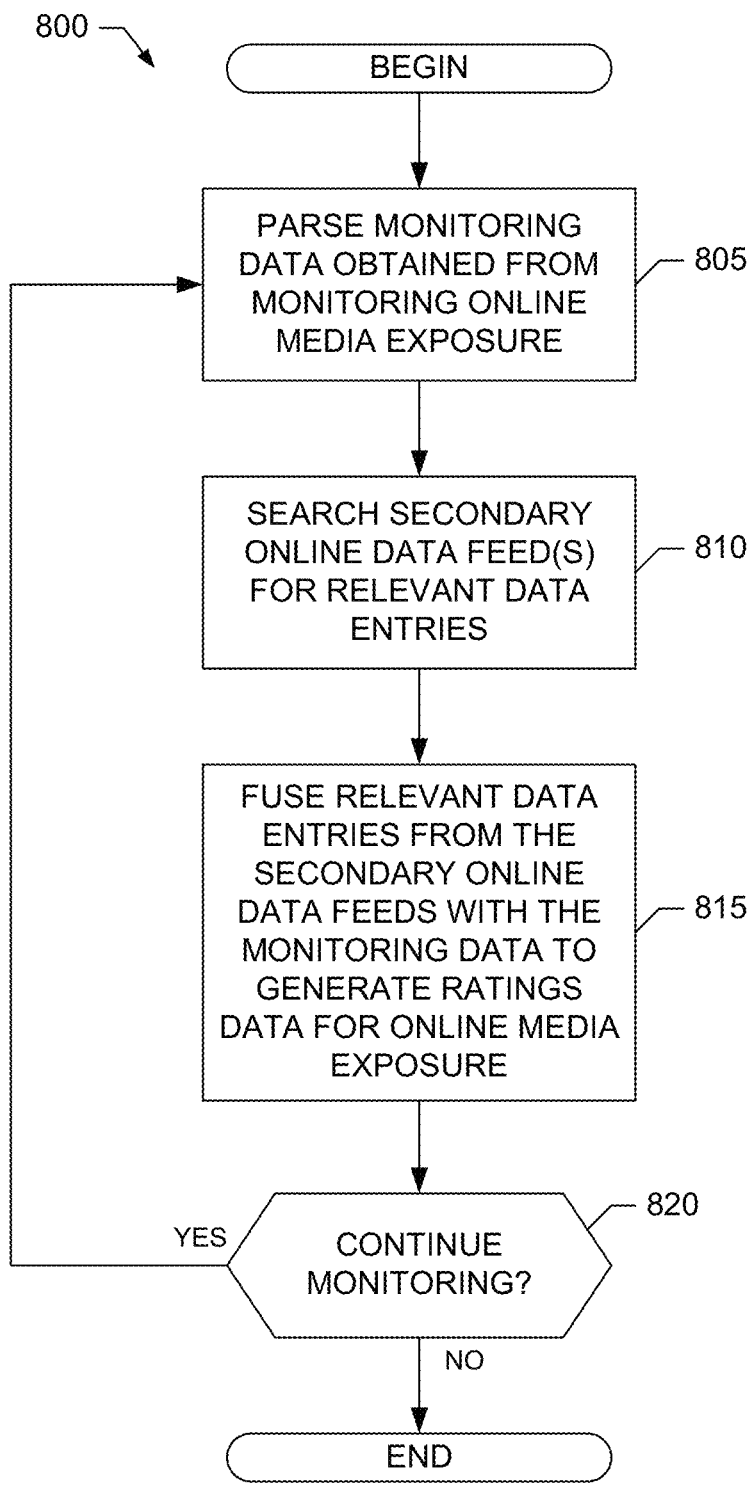
FIG. 8 is a flowchart representative of example machine readable instructions that may be executed to implement the example audience measurement entity server of FIGS. 1 and/or 3.

An example program 800 that may be executed to implement the example AME server 105 of FIGS. 1-7 is represented by the flowchart shown in FIG. 8. For convenience and without loss of generality, execution of the example program 800 is described in the context of the AME server 105 operating in the example environment of use 100 of FIG. 1. With reference to the preceding figures and associated written descriptions, the example program 800 of FIG. 8 begins execution at block 805 at which the example monitoring data parser 405 of the AME server 105 implements the example media monitoring data parsing process 205 described above to parse the online media monitoring data 130/135 to obtain the media identifiers and associated timestamps contained therein. At block 810, one or more of the secondary data feed parsers 410 of the AME server 105 implement one or more of the secondary online data feed parsing processes 210 described above to parse the secondary online data feed(s) 140, 150, 160 and/or 170 to obtain secondary information (e.g., such as social media data, news data, weather data, program guide data, etc.) to be fused with the online media monitoring data 130/135 to generate ratings data. At block 815, the example ratings data generator 420 and one or more of the example secondary data feed searchers 415 of the AME server 105 implement the example data fusion process 235 described above to fuse the parsed online media monitoring data 130/135 with relevant information parsed from the secondary online data feed(s) 140, 150, 160 and/or 170 to determine ratings data characterizing exposure to the online media identified in the online media monitoring data 130/135.

Figure 9:
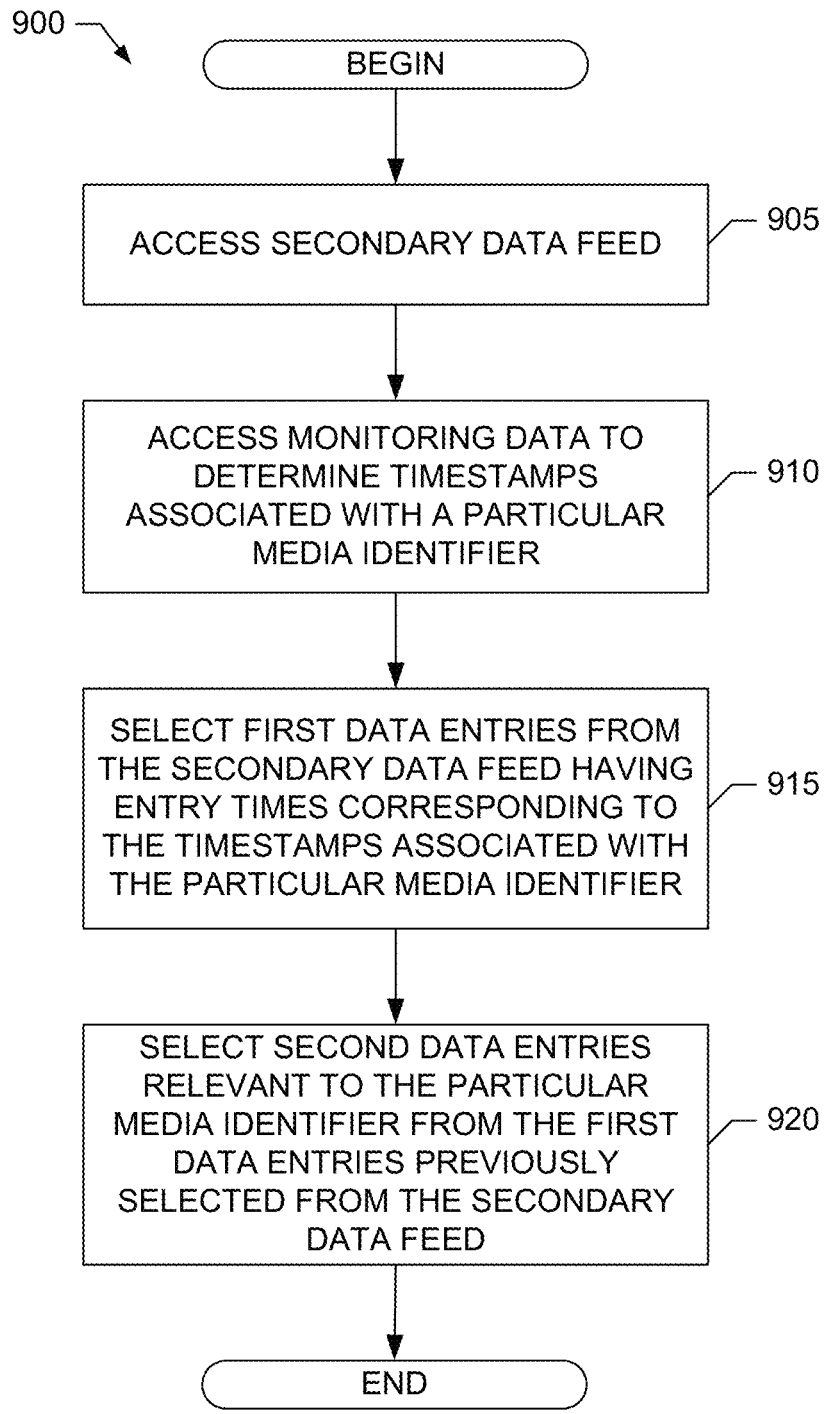
FIG. 9 is a flowchart representative of example machine readable instructions that may be executed to implement the example secondary data feed searcher of FIGS. 4 and/or 5.

An example program 810P that may be executed to implement one or more of the example secondary feed data searchers 415 of FIGS. 4 and/or 5, and/or that may be used to perform the processing at block 810 of FIG. 8 to select secondary data feed entries for combining with online media monitoring data, is represented by the flowchart shown in FIG. 9. With reference to the preceding figures and associated written descriptions, the example program 900 of FIG. 9 begins execution at block 905 at which a secondary feed data searcher 415 accesses a secondary online data feed (such as one or more of the feeds 140, 150, 160 and/or 170) to be used to generate ratings data. At block 910, the secondary feed data searcher 415 accesses the online media monitoring data 130/135 (e.g., after parsing) to access a particular media identifier and the timestamps associated with that media identifier. At block 915, the example timestamp filter 505 of the secondary feed data searcher 415 selects, as described above, a first group of parsed data entries from the secondary online data feed having entry times (e.g., timestamps) corresponding to (e.g., equal to or within one or more time window(s) of, etc.) the timestamps included in the media monitoring data entries for the particular media identifier. At block 920, the example media identifier filter 510 of the secondary feed data searcher 415 selects, based on the particular media identifier being examined and as described above, a second group of data entries from the first group of secondary data feed entries previously selected at block 915. In the illustrated example, the resulting second group of data entries are the data entries from which secondary data feed information is to be obtained for determining the ratings data associated with the particular media identifier. In some examples, execution of the program 900 is repeated for different media identifiers represented in the online media monitoring data 130/135.

Figure 10:
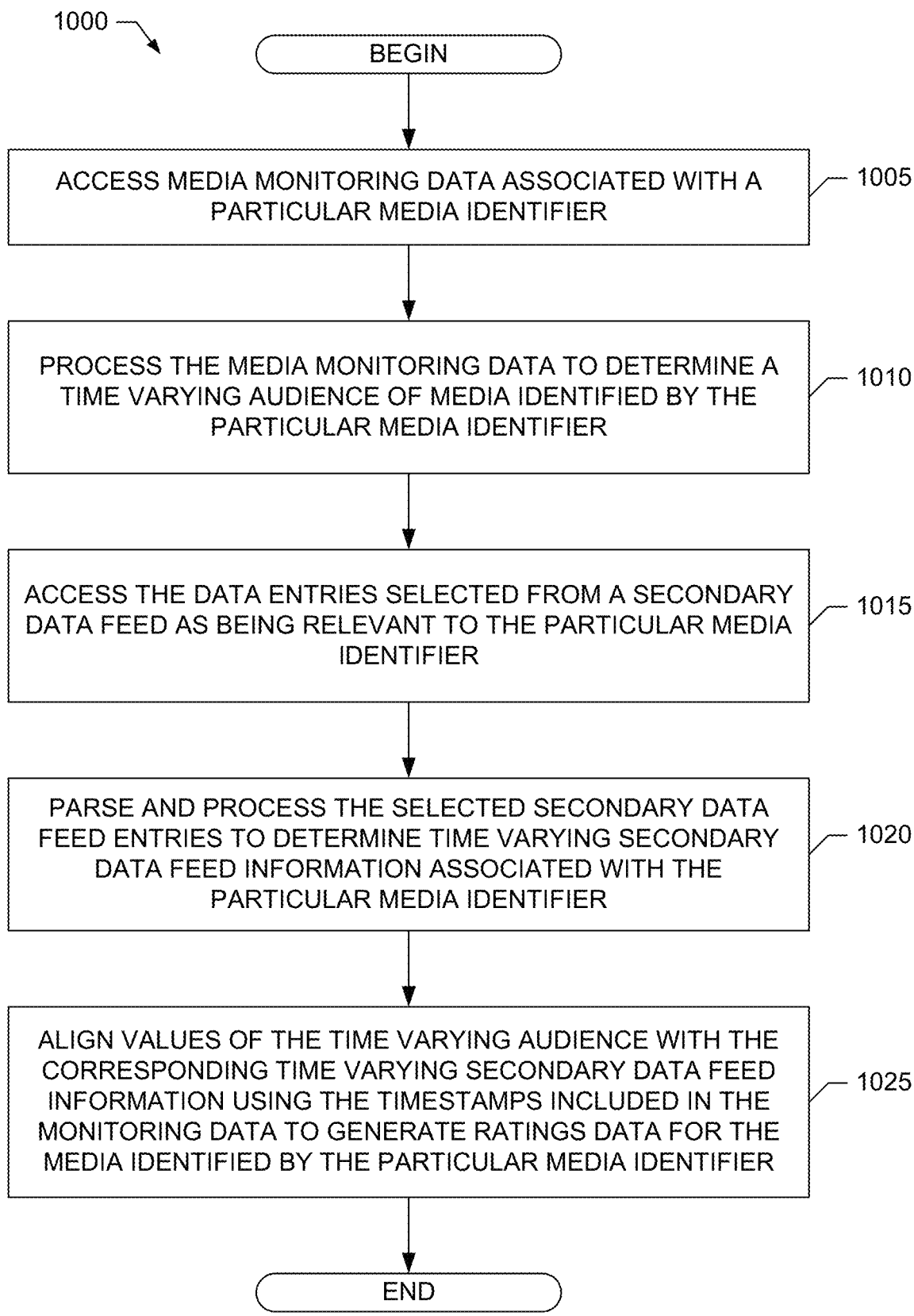
FIG. 10 is a flowchart representative of first example machine readable instructions that may be executed to implement the example ratings data generator of FIGS. 4 and/or 6.

A first example program 1000 that may be executed to implement the example ratings data generator 420 of FIGS. 4 and/or 6 is illustrated in FIG. 10. With reference to the preceding figures and associated written descriptions, the example program 1000 of FIG. 10 begins execution at block 1005 at which the ratings data generator 420 accesses the online media monitoring data 130/135 (e.g., after parsing) to access a particular media identifier and the timestamps associated with that media identifier. At block 1010, the example audience determiner 605 processes, as described above, the data entries in the online media monitoring data 130/135 corresponding to the particular media identifier and associated timestamps accessed at block 1005 to determine a time varying audience of media identified by the particular media identifier at times corresponding to the associated timestamps. At block 1015, the ratings data generator 420 accesses data entries from one or more of the secondary online data feeds 140, 150, 160 and/or 170, that were selected (e.g., by the secondary data feed searcher(s) 415, as described above) as relevant to the particular media identifier and associated timestamps for which ratings data is being generated.

At block 1020, the ratings data generator 420 processes, as described above, the parsed secondary data feed entries accessed at block 1015 to determine time varying secondary data feed information associated with the particular media identifier and/or corresponding to the timestamps associated with that particular media identifier. For example, and as described above, at block 1020 the example social impact determiner 610 of the ratings data generator 420 can process (e.g., using the example process 215) the selected data entries (e.g., selected based on the particular media identifier and its associated timestamps) from the social media data feed(s) 140 to determine the time varying social impact of the media identified by the particular media identifier and at times corresponding to the timestamps associated with the particular media identifier. Additionally or alternatively, at block 1020 the example news event determiner 615 of the ratings data generator 420 selects and processes (e.g., using the example process 220) the news feed data entries, as described above, to select and extract information from those news feed data entries likely to affect exposure to the media identified by the particular media identifier at times corresponding to the timestamps associated with the particular media identifier. Additionally or alternatively, at block 1020 the example weather event determiner 620 of the ratings data generator 420 selects and processes (e.g., using the process 225) weather feed data entries, as described above, to select and extract information from those news feed data entries corresponding to (e.g., at the same time or within time windows of) the timestamps associated with the particular media identifier. Additionally or alternatively, at block 1020 the example program guide event determiner 625 of the ratings data generator 420 selects and processes (e.g., using the process 230) program guide data entries parsed from the program guide feed(s) 170 to select and extract information from those program guide data entries corresponding to (e.g., at the same time or within time windows of) the timestamps associated with the particular media identifier, as described above. At block 1025, the example data aligner 630 of the ratings data generator 420 aligns, based on the monitoring data timestamps and as described above, values of the time varying audience determined at block 1010 for the particular media identifier at different times corresponding to its associated timestamps with the information obtained at block 1020 from the one or more secondary online data feeds to generate ratings data (e.g., real-time ratings data) characterizing exposure to the online media identified by the particular media identifier and at different times corresponding to monitoring data timestamps. In some examples, execution of the program 1000 is repeated for different media identifiers represented in the online media monitoring data 130/135.

Figure 11:
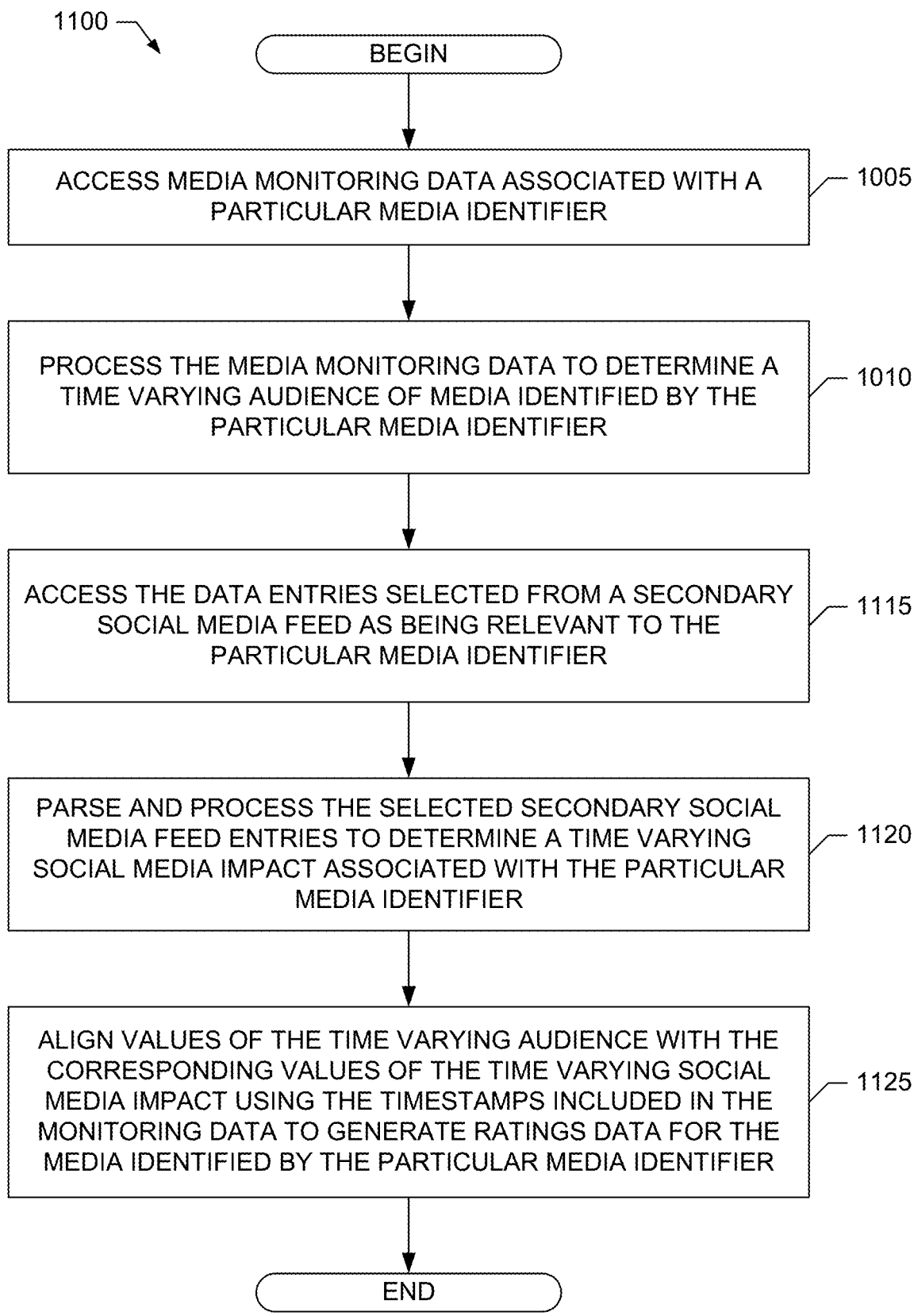
FIG. 11 is a flowchart representative of second example machine readable instructions that may be executed to implement the example ratings data generator of FIGS. 4 and/or 6.

A second example program 1100 that may be executed to implement the example ratings data generator 420 of FIGS. 4 and/or 6 is illustrated in FIG. 11. With reference to the preceding figures and associated written descriptions, the example program 1100 of FIG. 11 begins execution at blocks 1005 and 1010, which are described above in connection with FIG. 10. At block 1115, the ratings data generator 420 accesses data entries from the social media data feed(s) 140 that were selected (e.g., by the secondary data feed searcher(s) 415, as described above) as relevant to the particular media identifier and associated timestamps for which ratings data is being generated. At block 1120, the example social impact determiner 610 of the ratings data generator 420 performs the example social media data parsing process 215 to process, as described above, the social media data entries accessed at block 1115 to determine the time varying social impact of the media identified by the particular media identifier and at times corresponding to the timestamps associated with the particular media identifier. At block 1125, the example data aligner 630 of the ratings data generator 420 aligns, based on the monitoring data timestamps and as described above, values of the time varying audience determined at block 1010 for the particular media identifier at different times corresponding to its associated timestamps with corresponding values of the time varying social impact obtained at block 1120 to generate ratings data (e.g., real-time ratings data) characterizing exposure to the online media identified by the particular media identifier and at different times corresponding to monitoring data timestamps. In some examples, execution of the program 1100 is repeated for different media identifiers represented in the online media monitoring data 130/135.

Figure 12:
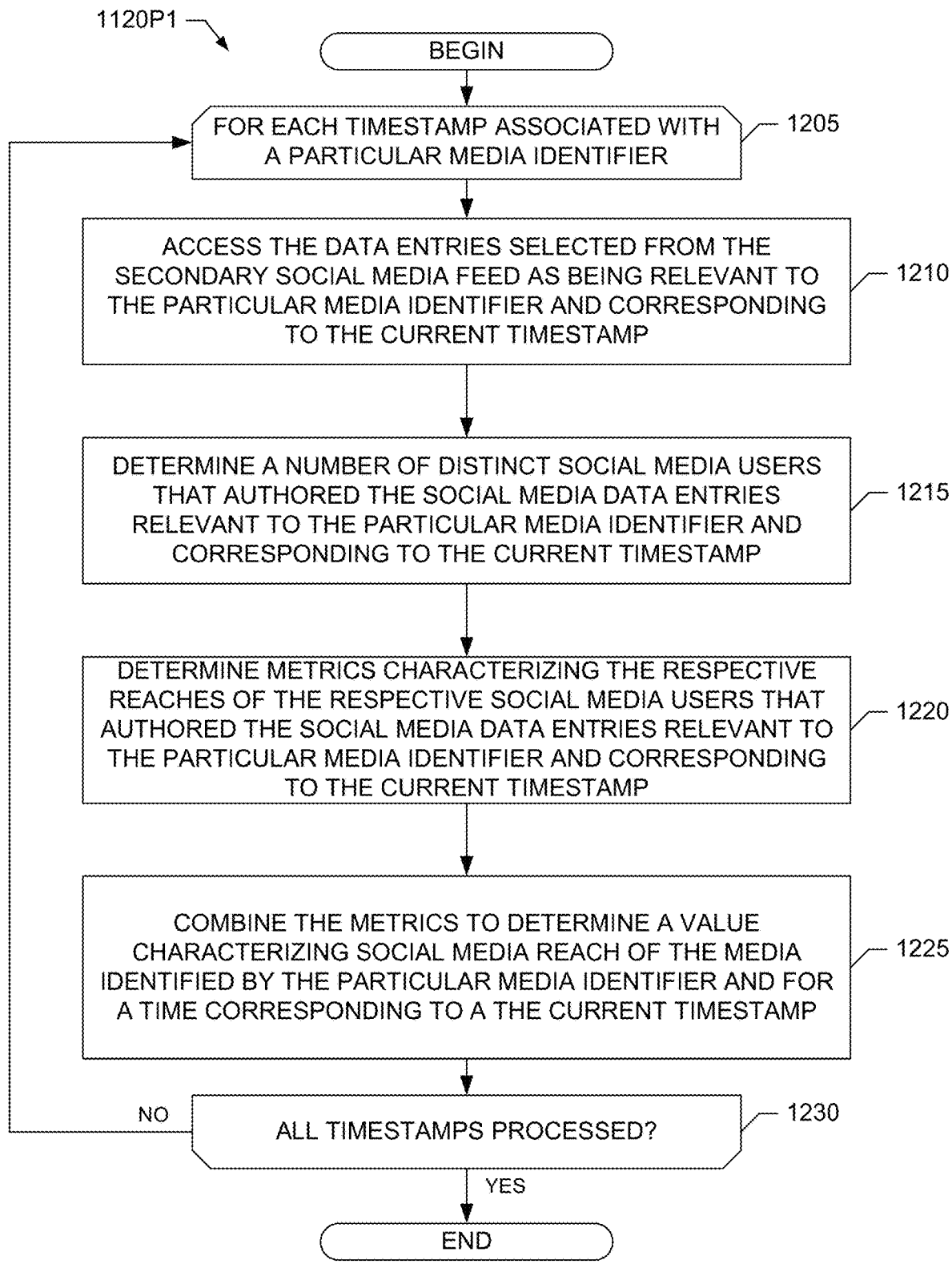
FIG. 12 is a flowchart representative of third example machine readable instructions that may be executed to implement the example ratings data generator of FIGS. 4 and/or 6.

A third example program 1120P1 that may be executed to implement the example ratings data generator 420 of FIGS. 4 and/or 6 is illustrated in FIG. 12. For example, the program 1120P1 may be used to implement the processing at block 1120 of FIG. 11. With reference to the preceding figures and associated written descriptions, the example program 1120P1 of FIG. 12 begins execution at block 1205 at which, for a particular media identifier included in the online media monitoring data 130/135, the example social impact determiner 610 of the ratings data generator 420 examines each timestamp associated with the particular media identifier in the monitoring data 130/135. For a given timestamp being examined, at block 1210 the social impact determiner 610 accesses a subset of the data entries that were selected from the social media data feed(s) 140 (e.g., by the secondary data feed searcher(s) 415, as described above) as relevant to the particular media identifier and current timestamp being examined. In some examples, at block 1215, the example social impact determiner 610 determines a respective number of distinct social media users associated with (e.g., who posted, submitted, authored, updated, etc.) the subset of the social media data entries accessed at block 1210 as corresponding to that current timestamp being examined. In some examples, at block 1220, the social impact determiner 610 determines, as described above, metrics characterizing the respective reaches of the social media users associated with (e.g., who posted, submitted, authored, updated, etc.) the subset of the social media data entries accessed at block 1210 as corresponding to that current timestamp being examined. In some examples, at block 1225, the social impact determiner 610 combines, as described above, the metrics determined at block 1220 to determine an overall value characterizing the social media reach of the media identified by the particular media identifier at a time corresponding to the current timestamp being examined. At block 1230, the social impact determiner 610 causes processing to continue until all timestamps associated with the particular media identifier have been processed. In some examples, execution of the program 1120P1 is repeated for different media identifiers represented in the online media monitoring data 130/135.

Figure 13:
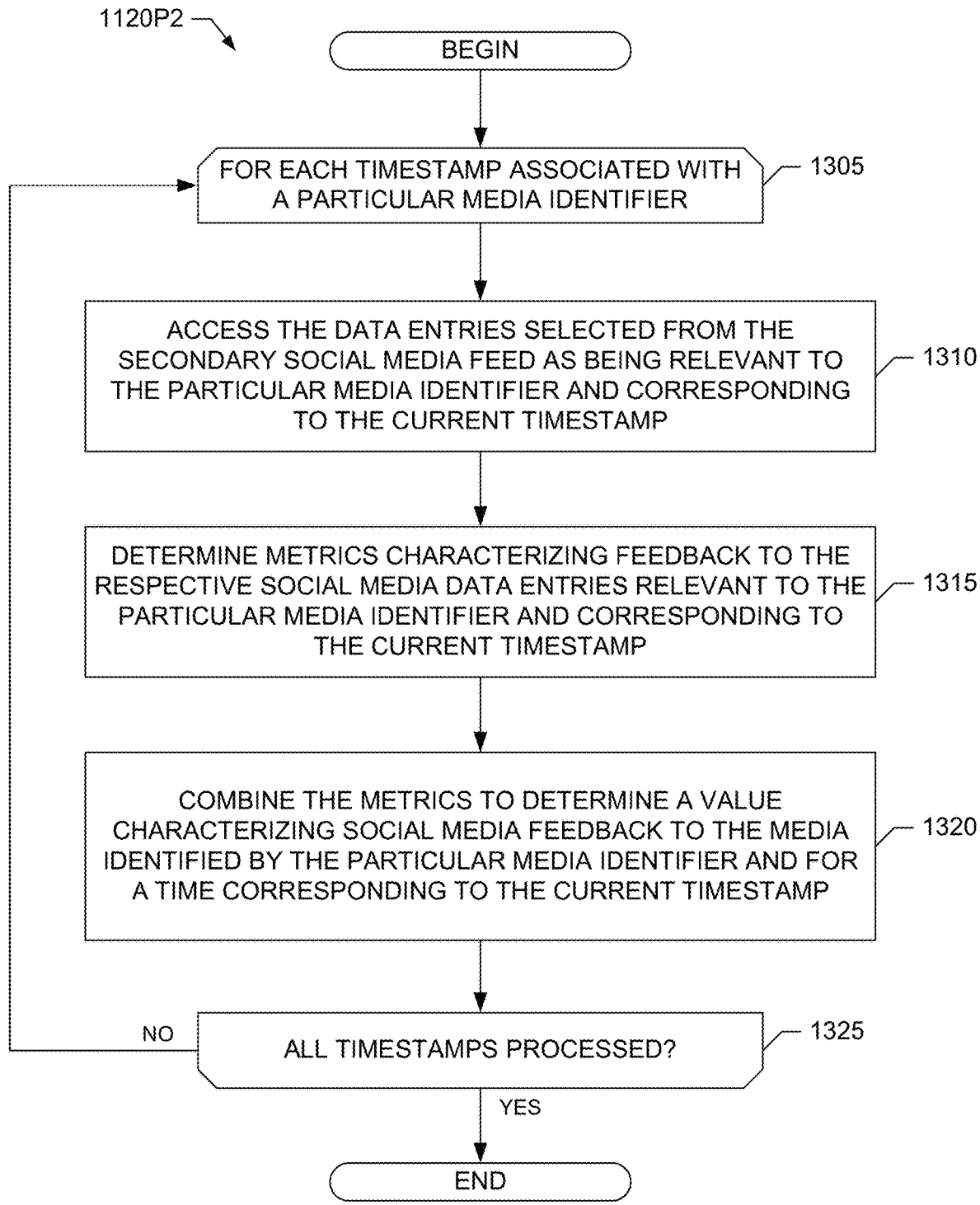
FIG. 13 is a flowchart representative of fourth example machine readable instructions that may be executed to implement the example ratings data generator of FIGS. 4 and/or 6.

A fourth example program 1120P2 that may be executed to implement the example ratings data generator 420 of FIGS. 4 and/or 6 is illustrated in FIG. 13. For example, the program 1120P2 may be used to implement the processing at block 1120 of FIG. 11. With reference to the preceding figures and associated written descriptions, the example program 1120P2 of FIG. 13 begins execution at block 1305 at which, for a particular media identifier included in the online media monitoring data 130/135, the example social impact determiner 610 of the ratings data generator 420 examines each timestamp associated with the particular media identifier in the monitoring data 130/135. For a given timestamp being examined, at block 1310 the social impact determiner 610 accesses a subset of the data entries that were selected from the social media data feed(s) 140 (e.g., by the secondary data feed searcher(s) 415, as described above) as relevant to the particular media identifier and current timestamp being examined. At block 1315, the social impact determiner 610 determines, as described above, metrics characterizing the social media feedback (e.g., number of likes, number of dislikes, number of thumbs-up, number of thumbs-down, etc.) to the respective entries of the subset of the social media data entries accessed at block 1310 as corresponding to that current timestamp being examined. At block 1320, the social impact determiner 610 combines, as described above, the metrics determined at block 1315 to determine an overall value characterizing the social media response to the media identified by the particular media identifier at a time corresponding to the current timestamp being examined. At block 1325, the social impact determiner 610 causes processing to continue until all timestamps associated with the particular media identifier have been processed. In some examples, execution of the program 1120P2 is repeated for different media identifiers represented in the online media monitoring data 130/135.

Figure 14:
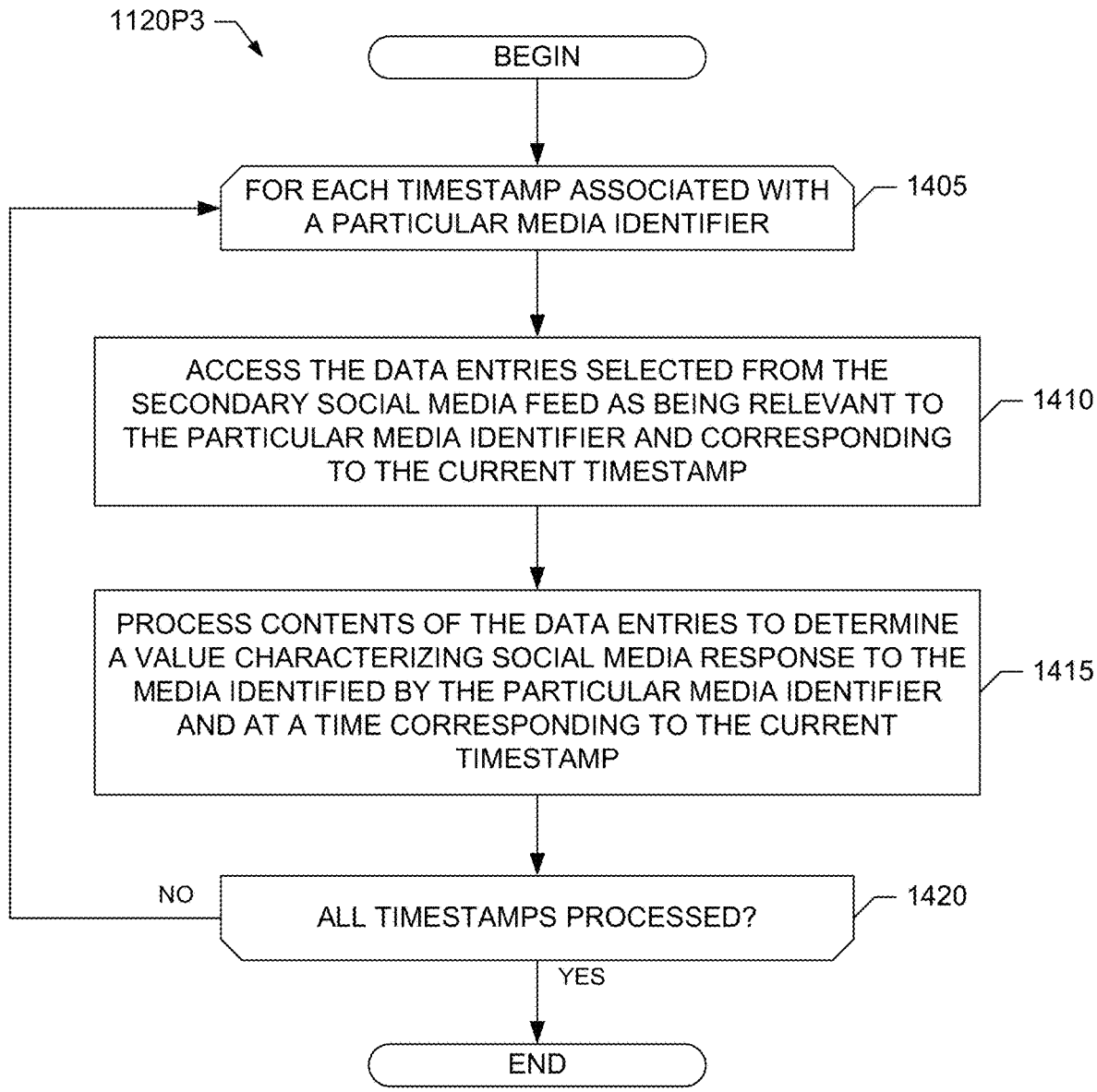
FIG. 14 is a flowchart representative of fifth example machine readable instructions that may be executed to implement the example ratings data generator of FIGS. 4 and/or 6.

A fifth example program 1120P3 that may be executed to implement the example ratings data generator 420 of FIGS. 4 and/or 6 is illustrated in FIG. 14. For example, the program 1120P3 may be used to implement the processing at block 1120 of FIG. 11. With reference to the preceding figures and associated written descriptions, the example program 1120P3 of FIG. 14 begins execution at block 1405 at which, for a particular media identifier included in the online media monitoring data 130/135, the example social impact determiner 610 of the ratings data generator 420 examines each timestamp associated with the particular media identifier in the monitoring data 130/135. For a given timestamp being examined, at block 1410 the social impact determiner 610 accesses a subset of the data entries that were selected from the social media data feed(s) 140 (e.g., by the secondary data feed searcher(s) 415, as described above) as relevant to the particular media identifier and current timestamp being examined. At block 1415, the social impact determiner 610 processes, as described above, the contents of the respective entries of the subset of the social media data entries accessed at block 1410 to determine a social media response (e.g., a total number of positive entries, a percent of positive entries, a total number of negative entries, a percent of negative entries, etc.) to the media identified by the particular media identifier at a time corresponding to the current timestamp being examined. At block 1420, the social impact determiner 610 causes processing to continue until all timestamps associated with the particular media identifier have been processed. In some examples, execution of the program 1120P3 is repeated for different media identifiers represented in the online media monitoring data 130/135.

Figure 15:
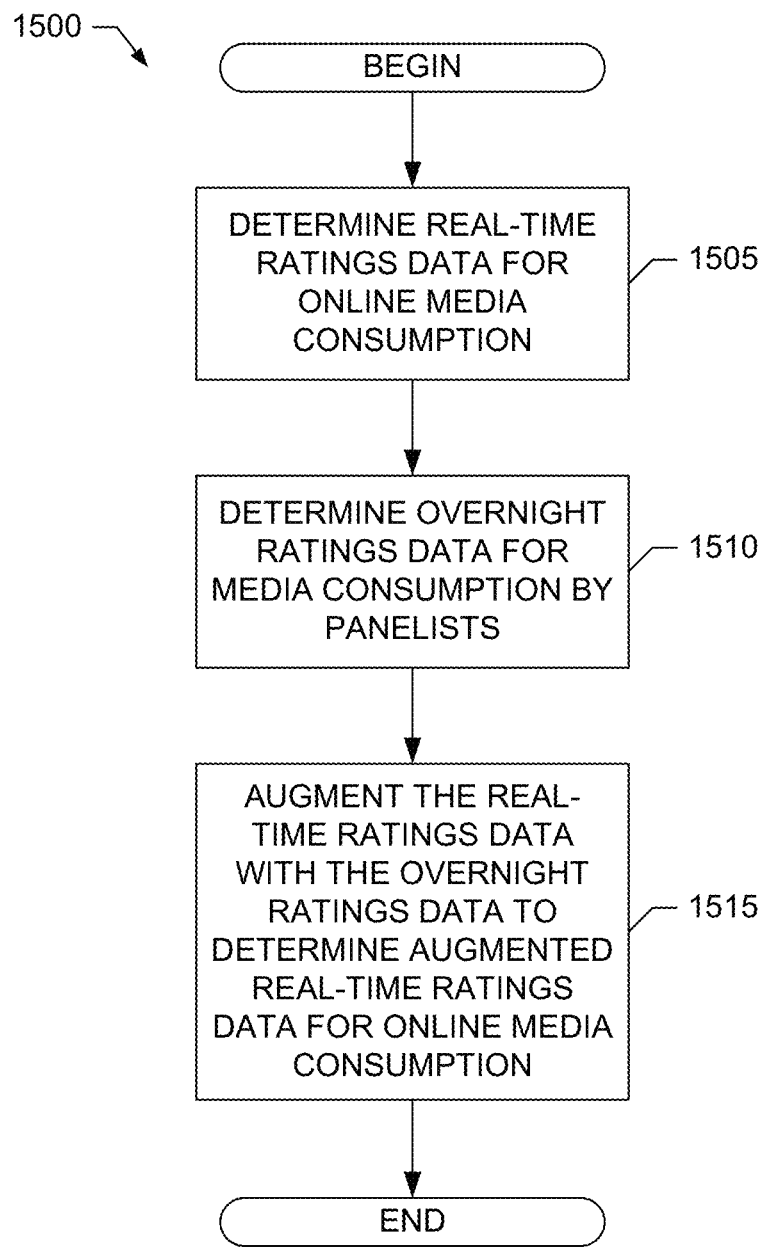
FIG. 15 is a flowchart representative of example machine readable instructions that may be executed to implement the example system of FIG. 7.

A second example program 1500 that may be executed to implement the example AME server 105 of FIGS. 1-7 is represented by the flowchart shown in FIG. 15. For convenience and without loss of generality, execution of the example program 1500 is described in the context of the AME server 105 operating in the example environment of use 700 of FIG. 7. With reference to the preceding figures and associated written descriptions, the example program 1500 of FIG. 15 begins execution at block 1505 at which the example real-time ratings processor 715 of the AME server 105 generates real-time ratings data characterizing online media exposure, as described above. At block 1510, the example overnight ratings processor 730 of the AME server 105 generates overnight ratings data characterizing media exposure associated with the panelists, as described above. At block 1515, the example real-time ratings augmenter 735 of the AME server 105 augments the real-time ratings data determined at block 1505 with information included in the overnight ratings data determined at block 1510 to determine augmented real-time ratings data characterizing online media exposure, as described above.

Figure 16:
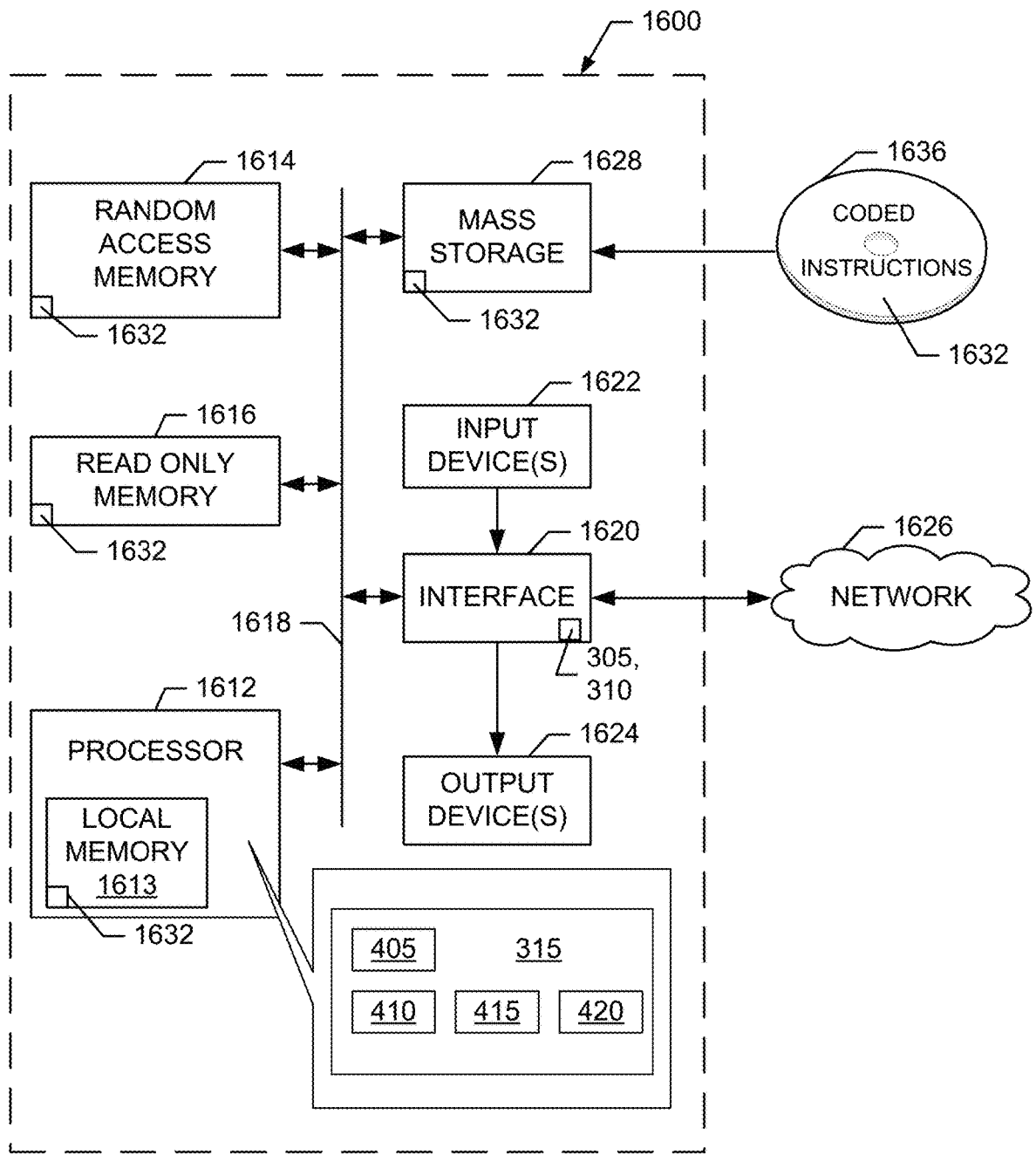
FIG. 16 is a block diagram of an example processor platform structured to execute the example machine readable instructions of FIGS. 8-13 and/or 14 to implement the example audience measurement entity server of FIGS. 1 and/or 3, which includes the example data fusion processor of FIGS. 3 and/or 4.

FIG. 16 is a block diagram of a first example processor platform 1600 to execute the instructions of FIGS. 8-13 and/or 14 to implement the example AME server 105 of FIGS. 1 and/or 3, which includes the example media monitoring data receiver 305, the example secondary data feed receiver 310 and the example data fusion processor 315 of FIG. 3. In the illustrated example of FIG. 16, the data fusion processor 315 includes the example monitoring data parser 405, the example secondary feed data parser(s) 410, the example secondary feed data searcher(s) 415 and the example ratings data generator 420 of FIG. 4. The processor platform 1600 can be, for example, a server, a personal computer, a mobile device (e.g., a cell phone, a smart phone, a tablet such as an iPad™), a personal digital assistant (PDA), an Internet appliance, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors or controllers from any desired family or manufacturer. In the illustrated example of FIG. 16, the processor 1612 is configured via example instructions 1632 to implement the example data fusion processor 315 of FIG. 3, which includes the example monitoring data parser 405, the example secondary feed data parser(s) 410, the example secondary feed data searcher(s) 415 and the example ratings data generator 420 of FIG. 4.

The processor 1612 of the illustrated example includes a local memory 1613 (e.g., a cache). The processor 1612 of the illustrated example is in communication with a main memory including a volatile memory 1614 and a non-volatile memory 1616 via a link 1618. The link 1618 may be implemented by a bus, one or more point-to-point connections, etc., or a combination thereof. The volatile memory 1614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), and/or a PCI express interface.

In the illustrated example, one or more input devices 1622 are connected to the interface circuit 1620. The input device(s) 1622 permit(s) a user to enter data and commands into the processor 1612. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1620 of the illustrated example, thus, typically includes a graphics driver card, a graphics driver chip or a graphics driver processor.

The interface circuit 1620 of the illustrated example also includes a communication device such as a transmitter, a receiver, a transceiver, a modem and/or network interface card to facilitate exchange of data with external machines (e.g., computing devices of any kind) via a network 1626 (e.g., an Ethernet connection, a digital subscriber line (DSL), a telephone line, coaxial cable, a cellular telephone system, etc.). In the illustrated example of FIG. 16, the interface circuit 1620 is configured via example instructions 1632 to implement the example media monitoring data receiver 305 and the example secondary data feed receiver 310 of FIG. 3.

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, RAID (redundant array of independent disks) systems, and digital versatile disk (DVD) drives.

Coded instructions 1632 corresponding to the instructions of FIGS. 8-14 may be stored in the mass storage device 1628, in the volatile memory 1614, in the non-volatile memory 1616, in the local memory 1613 and/or on a removable tangible computer readable storage medium, such as a CD or DVD 1636.

Figure 17:
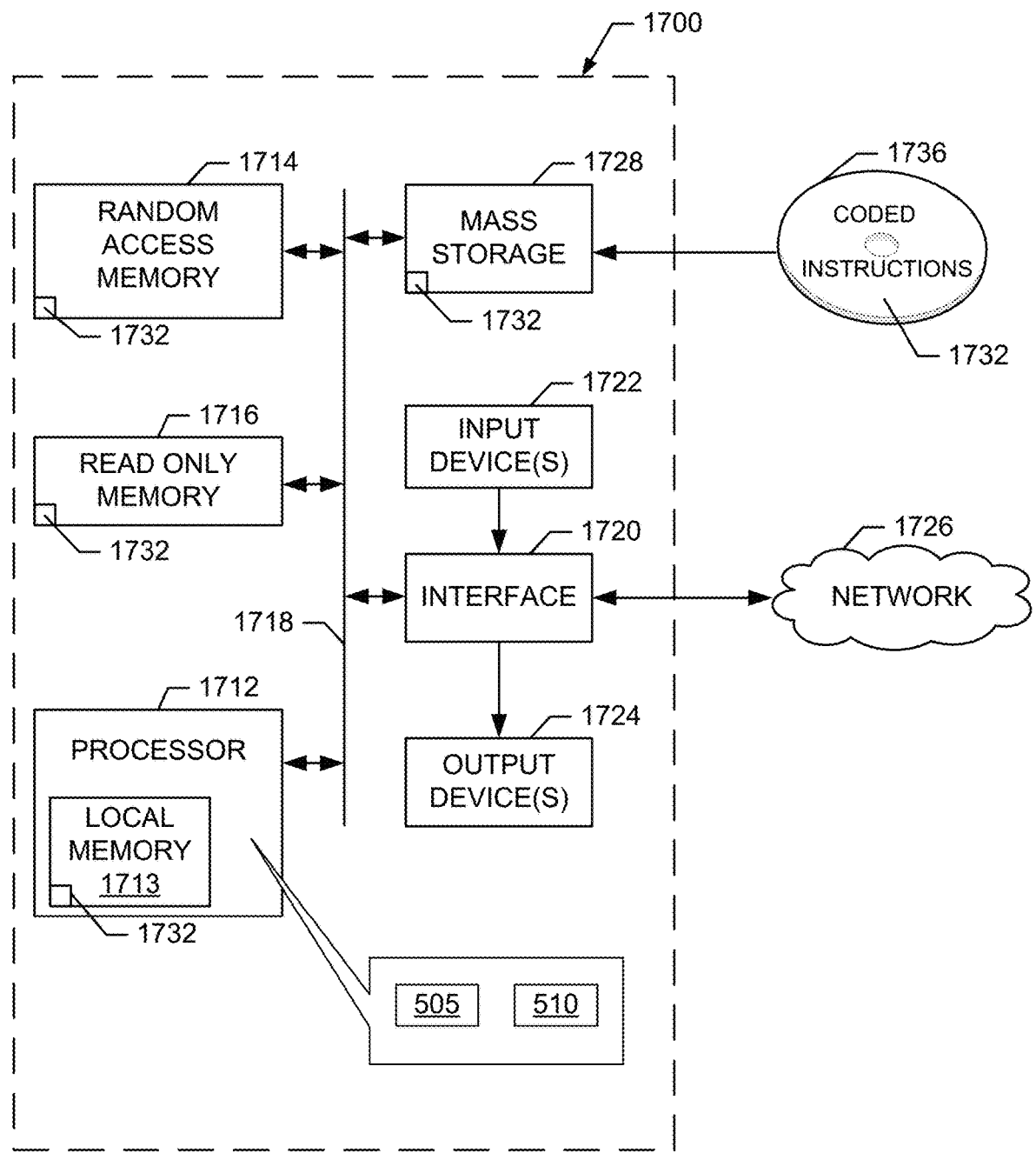
FIG. 17 is a block diagram of an example processor platform structured to execute the example machine readable instructions of FIG. 9 to implement the example secondary data feed searcher of FIGS. 4 and/or 5.

FIG. 17 is a block diagram of a second example processor platform 1700 to execute the instructions of FIG. 9 to implement the example secondary feed data searcher 415 of FIGS. 4 and/or 5, which includes the example timestamp filter 505 and the example media identifier filter 510. The processor platform 1700 can be, for example, a server, a personal computer, a mobile device (e.g., a cell phone, a smart phone, a tablet such as an iPad™), a personal digital assistant (PDA), an Internet appliance, or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors or controllers from any desired family or manufacturer. In the illustrated example of FIG. 17, the processor 1712 is configured via example instructions 1732 to implement the example secondary feed data searcher 415 of FIGS. 4 and/or 5, which includes the example timestamp filter 505 and the example media identifier filter 510.

The processor 1712 of the illustrated example includes a local memory 1713 (e.g., a cache). The processor 1712 of the illustrated example is in communication with a main memory including a volatile memory 1714 and a non-volatile memory 1716 via a link 1718. The link 1718 may be implemented by a bus, one or more point-to-point connections, etc., or a combination thereof. The volatile memory 1714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), and/or a PCI express interface.

In the illustrated example, one or more input devices 1722 are connected to the interface circuit 1720. The input device(s) 1722 permit(s) a user to enter data and commands into the processor 1712. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1720 of the illustrated example, thus, typically includes a graphics driver card, a graphics driver chip or a graphics driver processor.

The interface circuit 1720 of the illustrated example also includes a communication device such as a transmitter, a receiver, a transceiver, a modem and/or network interface card to facilitate exchange of data with external machines (e.g., computing devices of any kind) via a network 1726 (e.g., an Ethernet connection, a digital subscriber line (DSL), a telephone line, coaxial cable, a cellular telephone system, etc.).

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, RAID (redundant array of independent disks) systems, and digital versatile disk (DVD) drives.

Coded instructions 1732 corresponding to the instructions of FIG. 9 may be stored in the mass storage device 1728, in the volatile memory 1714, in the non-volatile memory 1716, in the local memory 1713 and/or on a removable tangible computer readable storage medium, such as a CD or DVD 1736.

Figure 18:
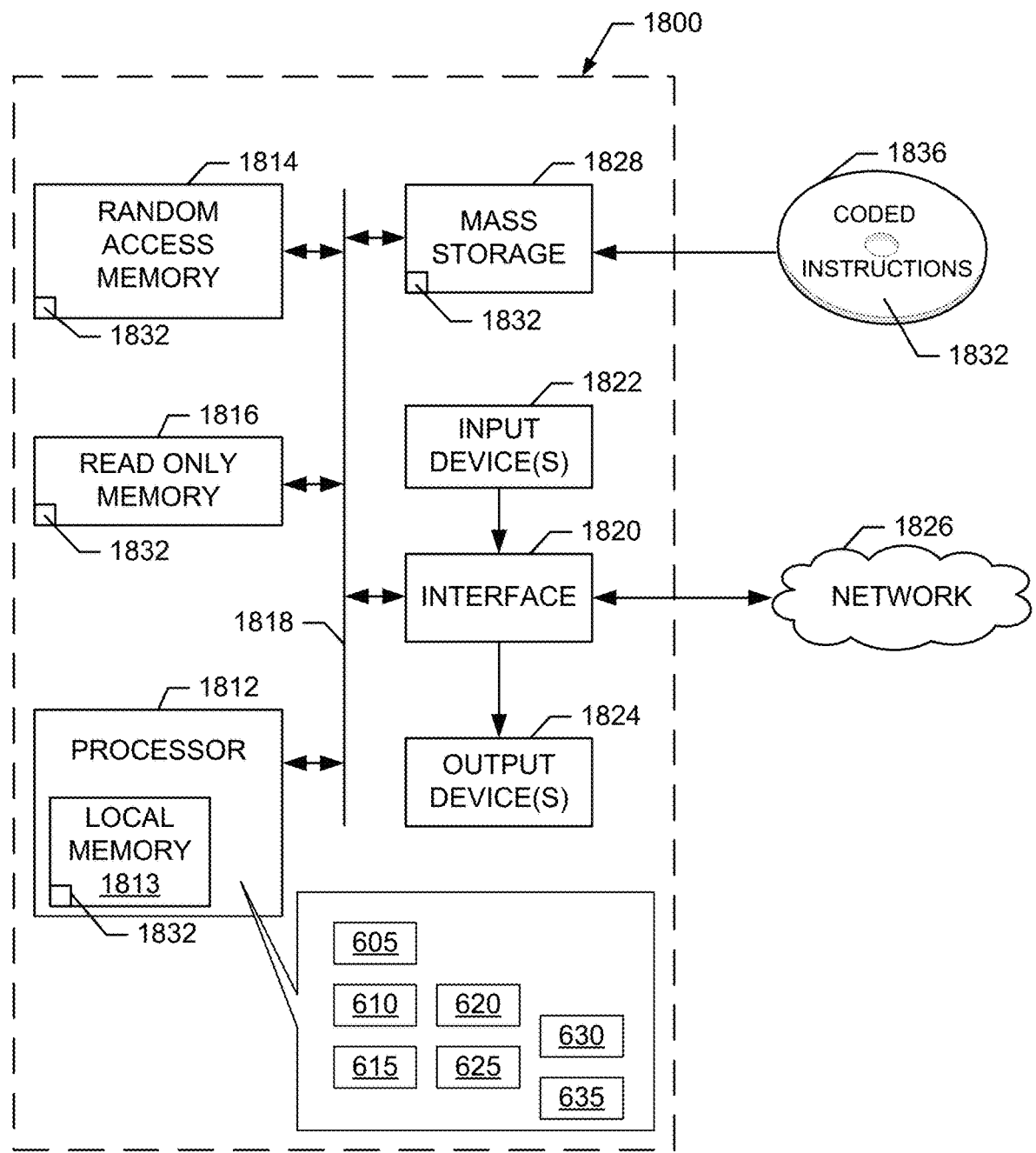
FIG. 18 is a block diagram of an example processor platform structured to execute the example machine readable instructions of FIGS. 10-13 and/or 14 to implement the example ratings data generator of FIGS. 4 and/or 6.

FIG. 18 is a block diagram of a third example processor platform 1800 to execute the instructions of FIGS. 10-13 and/or 14 to implement the example ratings data generator 420 of FIGS. 4 and/or 6, which includes the example audience determiner 605, the example social impact determiner 610, the example news event determiner 615, the example weather event determiner 620, the example program guide event determiner 625, the example data aligner 630 and the example ratings reporter 635. The processor platform 1800 can be, for example, a server, a personal computer, a mobile device (e.g., a cell phone, a smart phone, a tablet such as an iPad™), a personal digital assistant (PDA), an Internet appliance, or any other type of computing device.

The processor platform 1800 of the illustrated example includes a processor 1812. The processor 1812 of the illustrated example is hardware. For example, the processor 1812 can be implemented by one or more integrated circuits, logic circuits, microprocessors or controllers from any desired family or manufacturer. In the illustrated example of FIG. 18, the processor 1812 is configured via example instructions 1832 to implement the example ratings data generator 420 of FIGS. 4 and/or 6, which includes the example audience determiner 605, the example social impact determiner 610, the example news event determiner 615, the example weather event determiner 620, the example program guide event determiner 625, the example data aligner 630 and the example ratings reporter 635.

The processor 1812 of the illustrated example includes a local memory 1813 (e.g., a cache). The processor 1812 of the illustrated example is in communication with a main memory including a volatile memory 1814 and a non-volatile memory 1816 via a link 1818. The link 1818 may be implemented by a bus, one or more point-to-point connections, etc., or a combination thereof. The volatile memory 1814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1816 may be implemented by flash memory and/or any other desired type of memory device. Access to the main memory 1814, 1816 is controlled by a memory controller.

The processor platform 1800 of the illustrated example also includes an interface circuit 1820. The interface circuit 1820 may be implemented by any type of interface standard, such as an Ethernet interface, a universal serial bus (USB), and/or a PCI express interface.

In the illustrated example, one or more input devices 1822 are connected to the interface circuit 1820. The input device(s) 1822 permit(s) a user to enter data and commands into the processor 1812. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface.

One or more output devices 1824 are also connected to the interface circuit 1820 of the illustrated example. The output devices 1824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1820 of the illustrated example, thus, typically includes a graphics driver card, a graphics driver chip or a graphics driver processor.

The interface circuit 1820 of the illustrated example also includes a communication device such as a transmitter, a receiver, a transceiver, a modem and/or network interface card to facilitate exchange of data with external machines (e.g., computing devices of any kind) via a network 1826 (e.g., an Ethernet connection, a digital subscriber line (DSL), a telephone line, coaxial cable, a cellular telephone system, etc.).

The processor platform 1800 of the illustrated example also includes one or more mass storage devices 1828 for storing software and/or data. Examples of such mass storage devices 1828 include floppy disk drives, hard drive disks, compact disk drives, Blu-ray disk drives, RAID (redundant array of independent disks) systems, and digital versatile disk (DVD) drives.

Coded instructions 1832 corresponding to the instructions of FIGS. 10-13 and/or 14 may be stored in the mass storage device 1828, in the volatile memory 1814, in the non-volatile memory 1816, in the local memory 1813 and/or on a removable tangible computer readable storage medium, such as a CD or DVD 1836.

Figure 19:
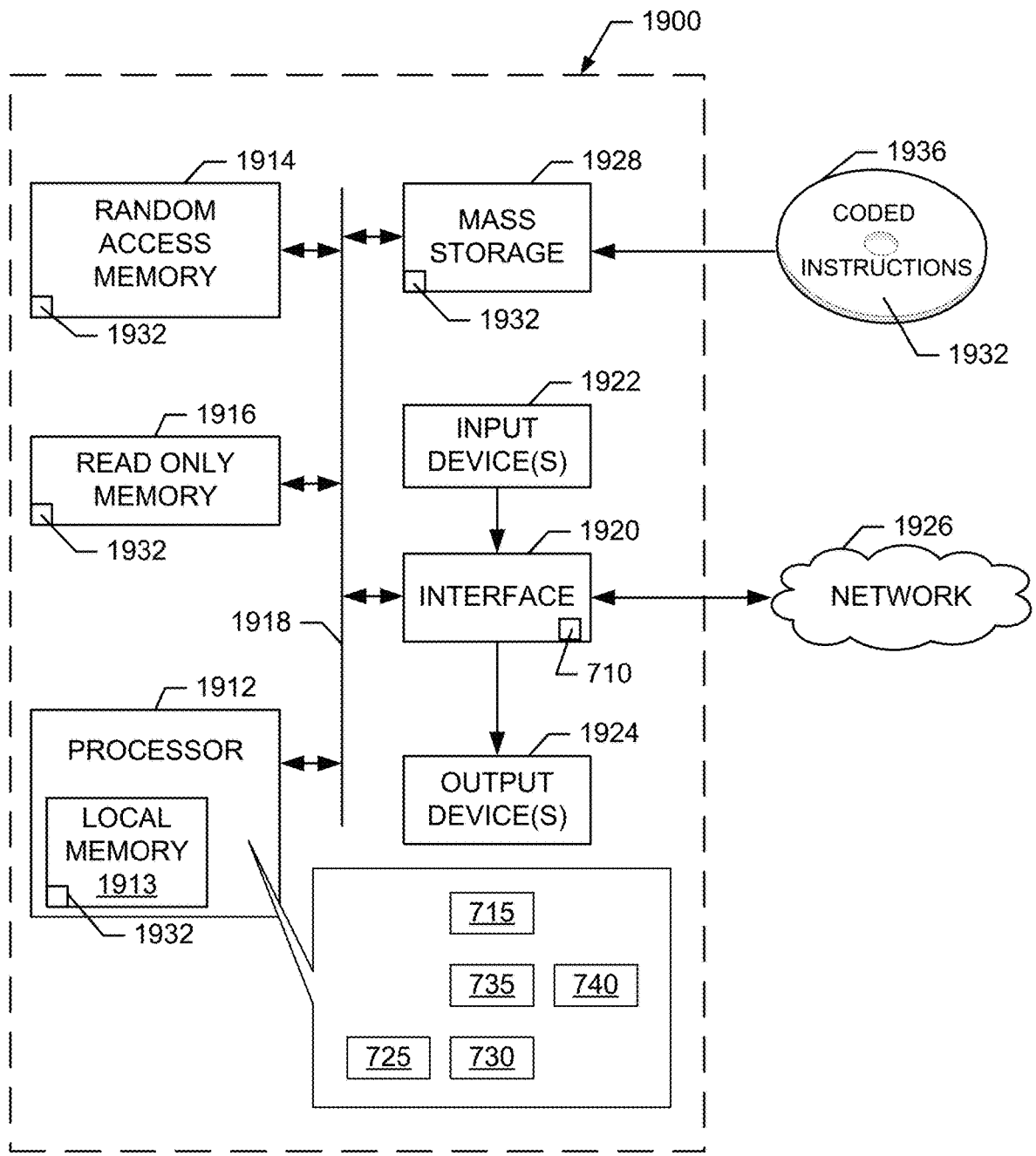
FIG. 19 is a block diagram of an example processor platform structured to execute the example machine readable instructions of FIG. 15 to implement the example audience measurement server of FIGS. 1 and/or 7.

FIG. 19 is a block diagram of a fourth example processor platform 1900 to execute the instructions of FIG. 15 to implement the example AME server 105 of FIGS. 1 and/or 7, which includes the example data receiver(s) 710, the example real-time ratings processor 715, the example back office processor 725, the example overnight ratings processor 730, the example real-time ratings augmenter 735 and the example ratings dashboard 740. The processor platform 1900 can be, for example, a server, a personal computer, a mobile device (e.g., a cell phone, a smart phone, a tablet such as an iPad™), a personal digital assistant (PDA), an Internet appliance, or any other type of computing device.

The processor platform 1900 of the illustrated example includes a processor 1912. The processor 1912 of the illustrated example is hardware. For example, the processor 1912 can be implemented by one or more integrated circuits, logic circuits, microprocessors or controllers from any desired family or manufacturer. In the illustrated example of FIG. 19, the processor 1912 is configured via example instructions 1932 to implement the example real-time ratings processor 715, the example back office processor 725, the example overnight ratings processor 730, the example real-time ratings augmenter 735, the example ratings dashboard 740 of FIG. 7.

The processor 1912 of the illustrated example includes a local memory 1913 (e.g., a cache). The processor 1912 of the illustrated example is in communication with a main memory including a volatile memory 1914 and a non-volatile memory 1916 via a link 1918. The link 1918 may be implemented by a bus, one or more point-to-point connections, etc., or a combination thereof. The volatile memory 1914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1816 may be implemented by flash memory and/or any other desired type of memory device. Access to the main memory 1914, 1916 is controlled by a memory controller.

The processor platform 1900 of the illustrated example also includes an interface circuit 1920. The interface circuit 1920 may be implemented by any type of interface standard, such as an Ethernet interface, a universal serial bus (USB), and/or a PCI express interface.

In the illustrated example, one or more input devices 1922 are connected to the interface circuit 1920. The input device(s) 1922 permit(s) a user to enter data and commands into the processor 1912. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface.

One or more output devices 1924 are also connected to the interface circuit 1920 of the illustrated example. The output devices 1924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1920 of the illustrated example, thus, typically includes a graphics driver card, a graphics driver chip or a graphics driver processor.

The interface circuit 1920 of the illustrated example also includes a communication device such as a transmitter, a receiver, a transceiver, a modem and/or network interface card to facilitate exchange of data with external machines (e.g., computing devices of any kind) via a network 1926 (e.g., an Ethernet connection, a digital subscriber line (DSL), a telephone line, coaxial cable, a cellular telephone system, etc.).

The processor platform 1900 of the illustrated example also includes one or more mass storage devices 1928 for storing software and/or data. Examples of such mass storage devices 1928 include floppy disk drives, hard drive disks, compact disk drives, Blu-ray disk drives, RAID (redundant array of independent disks) systems, and digital versatile disk (DVD) drives.

Coded instructions 1932 corresponding to the instructions of FIG. 15 may be stored in the mass storage device 1928, in the volatile memory 1914, in the non-volatile memory 1916, in the local memory 1913 and/or on a removable tangible computer readable storage medium, such as a CD or DVD 1936.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to determine ratings data for online media exposure, the method comprising:
   accessing, by executing an instruction with a processor, monitoring data from at least one of monitoring applications executed by respective ones of a group of online computing platforms or monitoring devices in communication with the respective ones of the group of online computing platforms, the at least one of the monitoring applications or the monitoring devices to monitor online media exposure associated with the group of online computing platforms, the monitoring data including timestamps and instances of a first media identifier associated with respective ones of the timestamps, the respective ones of the timestamps indicating when first streaming media identified by the first media identifier was at least one of presented or accessed via the group of online computing platforms;
   selecting first data entries from a first online data feed having entry times corresponding to the respective ones of the timestamps associated with the first media identifier in the monitoring data;
   selecting second data entries from the first data entries based on the first media identifier;
   combining the monitoring data and the second data entries to determine first ratings data characterizing exposure to the first streaming media identified by the first media identifier;
   parsing a second online data feed, different from the first online data feed, based on at least one keyword or phrase to identify one or more third data entries corresponding to one or more news or weather alerts associated with the at least one keyword or phrase; and
   presenting the one or more third data entries aligned in time with the first ratings data to depict whether the one or more news or weather alerts corresponding to the one or more third data entries are correlated with changes in a time varying audience of the first streaming media.

2. The method as defined in claim 1, wherein the first online data feed includes a social media feed, the selecting of the second data entries includes selecting the first data entries having content corresponding to the first streaming media identified by the first media identifier to be the second data entries, and the combining of the monitoring data and the second data entries includes:
   using the monitoring data to determine the time varying audience of the first streaming media;
   using the second data entries to determine a time varying social impact of the first streaming media; and
   aligning values of the time varying audience with corresponding values of the time varying social impact based on the timestamps included in the monitoring data.

3. The method as defined in claim 2, wherein the using of the second data entries to determine the time varying social impact of the first streaming media includes:
   determining, for a first one of the timestamps associated with the first media identifier, a first number of distinct social media users that authored a first subset of the second data entries corresponding to the first one of the timestamps; and
   determining, for a second one of the timestamps associated with the first media identifier, a second number of distinct social media users that authored a second subset of the second data entries corresponding to the second one of the timestamps.

4. The method as defined in claim 3, wherein the using of the second data entries to determine the time varying social impact of the first streaming media further includes:
   combining metrics characterizing respective reaches of respective ones of the social media users in the first number of distinct social media users to determine a first value characterizing social media reach of the first streaming media at a first time corresponding to the first one of the timestamps associated with the first media identifier; and
   combining metrics characterizing respective reaches of respective ones of the social media users in the second number of distinct social media users to determine a second value characterizing the social media reach of the first streaming media at a second time corresponding to the second one of the timestamps associated with the first media identifier.

5. The method as defined in claim 2, wherein the using of the second data entries to determine the time varying social impact of the first streaming media includes:
    combining metrics characterizing feedback to respective ones of a first subset of the second data entries corresponding to a first one of the timestamps to determine a first value characterizing social media response to the first streaming media at a first time associated with the first one of the timestamps; and
    combining metrics characterizing feedback to respective ones of a second subset of the second data entries corresponding to a second one of the timestamps to determine a second value characterizing social media response to the first streaming media at a second time associated with the second one of the timestamps.

6. A non-transitory computer readable medium comprising machine readable instructions that, when executed, cause a machine to at least:
    access monitoring data from at least one of monitoring applications executed by respective ones of a group of online computing platforms or monitoring devices in communication with the respective ones of the group of online computing platforms, the at least one of the monitoring applications or the monitoring devices to monitor online media exposure associated with the group of online computing platforms, the monitoring data including timestamps and instances of a first media identifier associated with respective ones of the timestamps, the respective ones of the timestamps indicating when first streaming media identified by the first media identifier was at least one of presented or accessed via the group of online computing platforms;
    select first data entries from a first online data feed having entry times corresponding to the respective ones of the timestamps associated with the first media identifier in the monitoring data;
    select second data entries from the first data entries based on the first media identifier;
    combine the monitoring data and the second data entries to determine first ratings data characterizing exposure to the first streaming media identified by the first media identifier;
    parse a second online data feed, different from the first online data feed, based on at least one keyword or phrase to identify one or more third data entries corresponding to one or more news or weather alerts associated with the at least one keyword or phrase; and
    present the one or more third data entries aligned in time with the first ratings data to depict whether the one or more news or weather alerts corresponding to the one or more third data entries are correlated with changes in a time varying audience of the first streaming media.

7. The non-transitory computer readable medium as defined in claim 6, wherein the first online data feed includes a social media feed, wherein to select the second data entries, the machine readable instructions, when executed, further cause the machine to select the first data entries having content corresponding to the first streaming media identified by the first media identifier to be the second data entries, and wherein to combine the monitoring data and the second data entries, the machine readable instructions, when executed, further cause the machine to:
    use the monitoring data to determine the time varying audience of the first streaming media;
    use the second data entries to determine a time varying social impact of the first streaming media; and
    align values of the time varying audience with corresponding values of the time varying social impact based on the timestamps included in the monitoring data.

8. An apparatus to determine ratings data for online media exposure, the apparatus comprising:
    at least one logic circuit;
    a secondary feed data searcher implemented by the at least one logic circuit to:
        access monitoring data from at least one of monitoring applications executed by respective ones of a group of online computing platforms or monitoring devices in communication with the respective ones of the group of online computing platforms, the at least one of the monitoring applications or the monitoring devices to monitor online media exposure associated with the group of online computing platforms, the monitoring data including timestamps and instances of a first media identifier associated with respective ones of the timestamps, the respective ones of the timestamps indicating when first streaming media identified by the first media identifier was at least one of presented or accessed via the group of online computing platforms;
        select first data entries from a first online data feed having entry times corresponding to the respective ones of the timestamps associated with the first media identifier in the monitoring data; and
        select second data entries from the first data entries based on the first media identifier; and
    a ratings data generator implemented by the at least one logic circuit to:
        combine the monitoring data and the second data entries to determine first ratings data characterizing exposure to the first streaming media identified by the first media identifier;
        parse a second online data feed, different from the first online data feed, based on at least one keyword or phrase to identify one or more third data entries corresponding to one or more news or weather alerts associated with the at least one keyword or phrase; and
        present the one or more third data entries aligned in time with the first ratings data to depict whether the one or more news or weather alerts corresponding to the one or more third data entries are correlated with changes in a time varying audience of the first streaming media.

9. The apparatus as defined in claim 8, wherein the first online data feed includes a social media feed, the secondary feed data searcher is to select the second data entries by selecting the first data entries having content corresponding to the first streaming media identified by the first media identifier to be the second data entries, and the ratings data generator is to:
    use the monitoring data to determine the time varying audience of the first streaming media;
    use the second data entries to determine a time varying social impact of the first streaming media; and
    align values of the time varying audience with corresponding values of the time varying social impact based on the timestamps included in the monitoring data.

10. The apparatus as defined in claim 9, wherein the ratings data generator is further to:
   determine, for a first one of the timestamps associated with the first media identifier, a first number of distinct social media users that authored a first subset of the second data entries corresponding to the first one of the timestamps; and
   determine, for a second one of the timestamps associated with the first media identifier, a second number of distinct social media users that authored a second subset of the second data entries corresponding to the second one of the timestamps.

11. The apparatus as defined in claim 10, wherein the ratings data generator is further to:
   combine metrics characterizing respective reaches of respective ones of the social media users in the first number of distinct social media users to determine a first value characterizing social media reach of the first streaming media at a first time corresponding to the first one of the timestamps associated with the first media identifier; and
   combine metrics characterizing respective reaches of respective ones of the social media users in the second number of distinct social media users to determine a second value characterizing the social media reach of the first streaming media at a second time corresponding to the second one of the timestamps associated with the first media identifier.

12. The non-transitory computer readable medium as defined in claim 7, wherein to use the second data entries to determine the time varying social impact of the first streaming media, the machine readable instructions, when executed, further cause the machine to:
   determine, for a first one of the timestamps associated with the first media identifier, a first number of distinct social media users that authored a first subset of the second data entries corresponding to the first one of the timestamps; and
   determine, for a second one of the timestamps associated with the first media identifier, a second number of distinct social media users that authored a second subset of the second data entries corresponding to the second one of the timestamps.

13. The non-transitory computer readable medium as defined in claim 12, wherein to use the second data entries to determine the time varying social impact of the first streaming media, the machine readable instructions, when executed, further cause the machine to:
   combine metrics characterizing respective reaches of respective ones of the social media users in the first number of distinct social media users to determine a first value characterizing social media reach of the first streaming media at a first time corresponding to the first one of the timestamps associated with the first media identifier; and
   combine metrics characterizing respective reaches of respective ones of the social media users in the second number of distinct social media users to determine a second value characterizing the social media reach of the first streaming media at a second time corresponding to the second one of the timestamps associated with the first media identifier.

14. The non-transitory computer readable medium as defined in claim 7, wherein to use the second data entries to determine the time varying social impact of the first streaming media, the machine readable instructions, when executed, further cause the machine to:
   combine metrics characterizing feedback to respective ones of a first subset of the second data entries corresponding to a first one of the timestamps to determine a first value characterizing social media response to the first streaming media at a first time associated with the first one of the timestamps; and
   combine metrics characterizing feedback to respective ones of a second subset of the second data entries corresponding to a second one of the timestamps to determine a second value characterizing social media response to the first streaming media at a second time associated with the second one of the timestamps.

15. The non-transitory computer readable medium as defined in claim 7, wherein to use the monitoring data to determine the time varying audience of the first streaming media, the machine readable instructions, when executed, further cause the machine to use the instances of the first media identifier and the timestamps included in the monitoring data to determine a time varying number of the online computing platforms that at least one of accessed or presented the first streaming media over a first period of time.

16. The apparatus as defined in claim 9, wherein the ratings data generator is further to:
   combine metrics characterizing feedback to respective ones of a first subset of the second data entries corresponding to a first one of the timestamps to determine a first value characterizing social media response to the first streaming media at a first time associated with the first one of the timestamps; and
   combine metrics characterizing feedback to respective ones of a second subset of the second data entries corresponding to a second one of the timestamps to determine a second value characterizing social media response to the first streaming media at a second time associated with the second one of the timestamps.

17. The apparatus as defined in claim 9, wherein the ratings data generator is further to use the instances of the first media identifier and the timestamps included in the monitoring data to determine a time varying number of the online computing platforms that at least one of accessed or presented the first streaming media over a first period of time.

18. The method as defined in claim 1, further including:
   receiving at least a portion of the monitoring data electronically via a network; and
   receiving the first data entries of the first online data feed electronically via the network from a server.

19. The non-transitory computer readable medium as defined in claim 6, wherein the machine readable instructions, when executed, further cause the machine to:
   receive at least a portion of the monitoring data electronically via a network; and
   receive the first data entries of the first online data feed electronically via the network from a server.

20. The apparatus as defined in claim 8, further including a data receiver to:
   receive at least a portion of the monitoring data electronically via a network; and
   receive the first data entries of the first online data feed electronically via the network from a server.

* * * * *